United States Patent
Brown et al.

(10) Patent No.: US 10,956,386 B2
(45) Date of Patent: Mar. 23, 2021

(54) METHODS AND APPARATUSES FOR AUTOMATED PERFORMANCE TUNING OF A DATA MODELING PLATFORM

(71) Applicant: McKesson Corporation, Irving, TX (US)

(72) Inventors: Marion A. Brown, Spring, TX (US); Keith Hoyle, Montgomery, TX (US)

(73) Assignee: MCKESSON CORPORATION, Irving, TX (US)

( * ) Notice: Subject to any disclaimer, the term of this patent is extended or adjusted under 35 U.S.C. 154(b) by 308 days.

(21) Appl. No.: 15/942,176

(22) Filed: Mar. 30, 2018

(65) Prior Publication Data

US 2019/0303462 A1 Oct. 3, 2019

(51) Int. Cl.

| G06F 17/00 | (2019.01) |
|---|---|
| G06F 16/21 | (2019.01) |
| G06F 11/34 | (2006.01) |
| G06F 16/25 | (2019.01) |
| G06F 16/245 | (2019.01) |
| G06F 16/23 | (2019.01) |

(52) U.S. Cl.
CPC ........ *G06F 16/217* (2019.01); *G06F 11/3409* (2013.01); *G06F 16/245* (2019.01); *G06F 16/25* (2019.01); *G06F 16/23* (2019.01)

(58) Field of Classification Search
None
See application file for complete search history.

(56) References Cited

U.S. PATENT DOCUMENTS

| 5,560,005 A | 9/1996 | Hoover et al. |
|---|---|---|
| 6,175,837 B1 | 1/2001 | Sharma et al. |
| 6,738,798 B1 | 5/2004 | Ploetz et al. |
| 6,801,915 B1 | 10/2004 | Mack |
| 7,822,710 B1 | 10/2010 | Miller et al. |
| 8,341,191 B2 | 12/2012 | Weinberg |
| 9,684,512 B2 | 6/2017 | Bai et al. |

(Continued)

OTHER PUBLICATIONS

Anchor Modeling—Wikipedia, the free encyclopedia [online] [retrieved May 3, 2016]. Retrieved from the Internet: <URL: https://en.wikipedia.org/wiki/Anchor_modeling>. 3 pages.

(Continued)

*Primary Examiner* — Tuankhanh D Phan
(74) *Attorney, Agent, or Firm* — Alston & Bird LLP

(57) ABSTRACT

Embodiments are disclosed for automated performance tuning of a data modeling platform. An example method includes ingesting, using a tuning template, a set of records from one or more data sources into one or more stage tables in a staging layer of the data modeling platform. This example method further includes generating, using the one or more stage tables, a data integration layer of the data modeling platform for modeling data represented by the set of records ingested into the one or more stage tables. This example method further includes estimating an anticipated performance of the data modeling platform and generating an optimized tuning template based on the estimated anticipated performance. Finally, this example method further includes automatically executing a performance tuning operation on the data modeling platform. Corresponding apparatuses and computer program products are also provided.

20 Claims, 13 Drawing Sheets

(56) References Cited

U.S. PATENT DOCUMENTS

| | | |
|---|---|---|
| 9,805,081 B2 | 10/2017 | Scott et al. |
| 2004/0034550 A1 | 2/2004 | Menschiik et al. |
| 2004/0078236 A1 | 4/2004 | Stoodley et al. |
| 2005/0050068 A1 | 3/2005 | Vaschillo et al. |
| 2006/0036624 A1 | 2/2006 | Hild et al. |
| 2006/0136469 A1 | 6/2006 | Dettinger et al. |
| 2011/0004622 A1 | 1/2011 | Marson |
| 2011/0110515 A1* | 5/2011 | Tidwell ............ H04N 21/23109 380/200 |
| 2016/0085914 A1 | 3/2016 | Douglass et al. |
| 2016/0357839 A1 | 12/2016 | Hiltz-Laforge et al. |
| 2017/0286468 A1 | 10/2017 | Hoyle et al. |
| 2017/0286504 A1* | 10/2017 | Hoyle ................... G06F 16/254 |

OTHER PUBLICATIONS

Data Vault Modeling—Wikipedia, the free encyclopedia [online] [retrieved May 3, 2016]. Retrieved from the Internet: <URL: https://en.wikipedia.org/wiki/Data_Vault_modeling>. 11 pages.

Office Action for U.S. Appl. No. 15/086,266 dated Feb. 27, 2018, 16 pages.

* cited by examiner

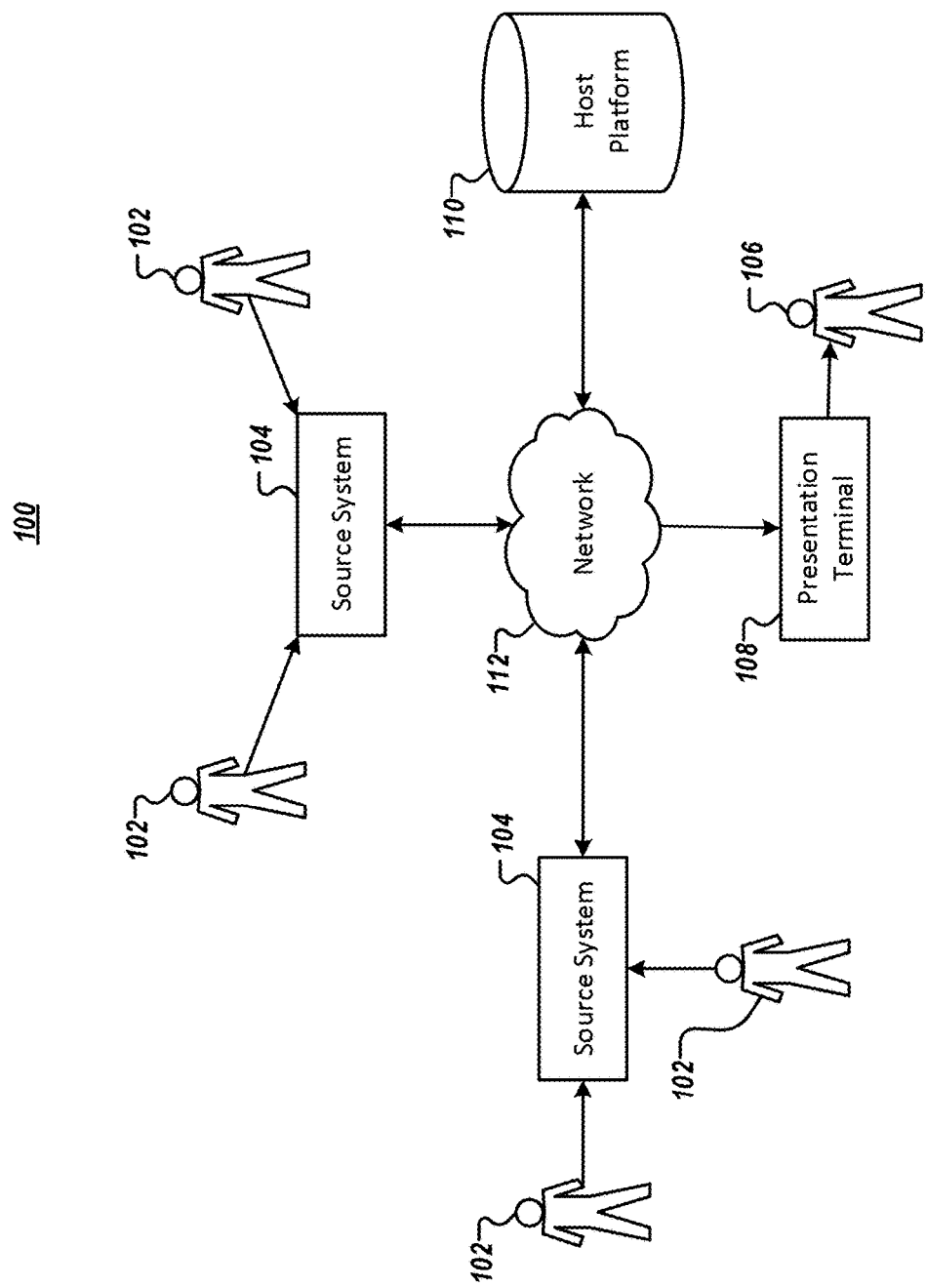

METHODS AND APPARATUSES FOR AUTOMATED PERFORMANCE TUNING OF A DATA MODELING PLATFORM

TECHNOLOGICAL FIELD

Example embodiments of the present invention relate generally to performance tuning of a data modeling platform and, more particularly, to methods and apparatuses for using standardized plumbing fields to enable automated performance tuning of a data modeling platform.

BACKGROUND

Traditional data modeling techniques suffer from a variety of defects. For instance, many traditional data modeling techniques (e.g., anchor modeling and data vault modeling) require one to understand what information will be important in a resulting data model (e.g., what data users need to review, and how would they view the data) prior to implementation. This information is typically the result of one or more Joint Application Design (JAD) sessions between various stakeholders involved in the implementation of the data model.

Similarly, such modeling techniques require a granular understanding of the data sources so that the relevant information can be harvested. Thus, one must learn how to decipher the types of data contained in records received from the various data sources, and one must also learn how that data is organized so it can be retrieved accurately and completely. Because the implementation of traditional modeling schemes requires that all of this must be known prior to implementation of a data model, there is a significant delay incurred before one can even begin to use a new data modeling platform.

Another downside to implementation of existing data modeling techniques is that they often carry a lack of transparency back to the data sources. In environments where records are subject to audit (e.g., due to laws or regulations governing sensitive information), changes to source data must be well-documented. Accordingly, traditional data modeling techniques that manipulate data end up becoming themselves subject to audit.

Still further, when data modeling platforms utilize transient staging areas, processing errors that extend past the retention window for transient data are not recoverable.

Finally, there are performance drawbacks from traditional data modeling techniques. To this end, performance tuning of an enterprise data warehouse is an important aspect of database management. Such tuning, however, presents continual challenges and historically has required constant—and error-prone—a manual upkeep, which adds to the total cost of ownership of the data warehouse. Moreover, above and beyond the difficulty of performance tuning generally, making changes becomes difficult as the system matures.

BRIEF SUMMARY

Manual tuning methods require highly seasoned consultants who must analyze usage patterns on a case-by-case basis and react accordingly. Moreover, specialized software that might address some of this work nevertheless require custom configuration and handholding. Example embodiments described herein address the above deficiencies and provide methods and apparatuses that enable an entity to more quickly and efficiently performance tune enterprise data sets en masse as well as provide more agile maintenance during acquisitions, platform changes, and the like. As such, example embodiments facilitate automated, consistent, fast, and cheap performance tuning of a data modeling platform, thereby increase the efficiency of the platform.

To do this, example embodiments described herein rest on a foundation that enables the ingestion of data into a staging layer in a distinct process separate from the determination of what underlying information will be important to the organization. This enables the re-casting of this data on-the-fly in a data integration layer. Moreover, by leveraging standardized plumbing fields, a tuning template can be developed and refined once, and then replicated across an entire enterprise data warehouse to performance tune the entire data warehouse in a uniform, automated, and fast way.

In a first example embodiment, a method is provided for automated performance tuning of a data modeling platform. The method includes ingesting, by data ingestion circuitry of the data modeling platform and using a tuning template, a set of records from one or more data sources into one or more stage tables in a staging layer of the data modeling platform, and generating, by data modeling circuitry of the data modeling platform and using the one or more stage tables, a data integration layer of the data modeling platform for modeling data represented by the set of records ingested into the one or more stage tables. The method further includes estimating, by tuning circuitry of the data modeling platform, an anticipated performance of the data modeling platform, and generating, by the tuning circuitry, an optimized tuning template based on the estimated anticipated performance. Finally, the method includes automatically executing a performance tuning operation on the data modeling platform.

In some embodiments, the method includes, after automatically executing the performance tuning operation on the data modeling platform, processing a query using the data modeling platform.

In some embodiments, ingesting a target record from a particular data source includes storing a copy of the target record as a record in a particular stage table in the staging layer that corresponds to the particular data source, adding a set of standardized plumbing fields into the record, and applying the tuning template to the record to populate the set of standardized plumbing fields. In some such embodiments, the tuning template comprises a set of instructions for populating each of the set of standardized plumbing fields using values from one or more other fields in the copy of the target record.

In some embodiments, generating the data integration layer using the one or more stage tables comprises generating, by the data modeling circuitry, a data alignment table defining a desired set of data fields, and generating, by the data modeling circuitry and using the one or more stage tables and the data alignment table, a key mapping table identifying correspondences between data fields in the one or more stage tables and data fields in the data alignment table. In some such embodiments, generating the data alignment table includes identifying, by the data modeling circuitry and from within one of the one or more stage tables, a record having a unique combination of values for the desired set of data fields defined by the data alignment table, generating, by the data modeling circuitry, a new record in the data alignment table corresponding to the identified record, and populating fields in the data alignment table for the generated new record based on the unique combination of values.

In some embodiments, the data integration layer comprises a plurality of partitions, and estimating the anticipated performance of the data integration layer includes calculating, by the tuning circuitry, a number of records in each partition in the data integration layer, determining, by the tuning circuitry and based on the number of records in each partition in the data integration layer, a degree of skew between partitions in the data integration layer, and estimating, by the tuning circuitry, the anticipated performance of the data integration layer based on the determined degree of skew.

In some embodiments, the optimized tuning template comprises a tuning template that, when applied to all records in all stage tables in the staging layer, modifies all corresponding sets of standardized plumbing fields such that generating a data integration layer using the one or more stage tables will automatically performance-tune the data modeling platform. Additionally or alternatively, the optimized tuning template is received by communications circuitry of the data modeling platform.

In some embodiments, automatically executing the performance tuning operation on the data modeling platform comprises applying the optimized tuning template to all records in all stage tables in the staging layer to update all corresponding sets of standardized plumbing fields, and in response to applying the optimized tuning template, generating the data integration layer by the data modeling circuitry and using the one or more stage tables.

In another example embodiment, an apparatus for automated performance tuning of a data modeling platform. The apparatus includes data ingestion circuitry configured to ingest, using a tuning template, a set of records from one or more data sources into one or more stage tables in a staging layer of the data modeling platform, data modeling circuitry configured to generate, using the one or more stage tables, a data integration layer of the data modeling platform for modeling data represented by the set of records ingested into the one or more stage tables, and tuning circuitry configured to estimate an anticipated performance of the data modeling platform, and generating, by the tuning circuitry, an optimized tuning template based on the estimated anticipated performance. In some such embodiments, the apparatus is further configured to automatically execute a performance tuning operation on the data modeling platform.

In some embodiments, the apparatus is further configured to, after automatically executing the performance tuning operation on the data modeling platform, process a query using the data modeling platform.

In some embodiments, the data ingestion circuitry is configured to ingest a target record from a particular data source by storing a copy of the target record as a record in a particular stage table in the staging layer that corresponds to the particular data source, adding a set of standardized plumbing fields into the record, and applying the tuning template to the record to populate the set of standardized plumbing fields. In some such embodiments, the tuning template comprises a set of instructions for populating each of the set of standardized plumbing fields using values from one or more other fields in the copy of the target record.

In some embodiments, the data modeling circuitry is configured to generate the data integration layer using the one or more stage tables by generating a data alignment table defining a desired set of data fields, and generating, using the one or more stage tables and the data alignment table, a key mapping table identifying correspondences between data fields in the one or more stage tables and data fields in the data alignment table. In such embodiments, the data modeling circuitry is configured to generate the data alignment table by identifying, from within one of the one or more stage tables, a record having a unique combination of values for the desired set of data fields defined by the data alignment table, generating a new record in the data alignment table corresponding to the identified record, and populating fields in the data alignment table for the generated new record based on the unique combination of values.

In some embodiments, the data integration layer comprises a plurality of partitions, and the tuning circuitry is configured to estimate the anticipated performance of the data integration layer by calculating a number of records in each partition in the data integration layer, determining, based on the number of records in each partition in the data integration layer, a degree of skew between partitions in the data integration layer, and estimating the anticipated performance of the data integration layer based on the determined degree of skew.

In some embodiments, the optimized tuning template comprises a tuning template that, when applied to all records in all stage tables in the staging layer, modifies all corresponding sets of standardized plumbing fields such that generating a data integration layer using the one or more stage tables will automatically performance-tune the data modeling platform.

In some embodiments, the apparatus is configured to automatically executing the performance tuning operation on the data modeling platform by applying the optimized tuning template to all records in all stage tables in the staging layer to update all corresponding sets of standardized plumbing fields, and in response to applying the optimized tuning template, generate the data integration layer by the data modeling circuitry and using the one or more stage tables.

In yet another example embodiment, a computer program product comprising at least one non-transitory computer-readable storage medium is provided for automated performance tuning of a data modeling platform. The at least one non-transitory computer-readable storage medium storing computer-executable instructions that, when executed, cause an apparatus to ingest, using a tuning template, a set of records from one or more data sources into one or more stage tables in a staging layer of the data modeling platform, and generate, using the one or more stage tables, a data integration layer of the data modeling platform for modeling data represented by the set of records ingested into the one or more stage tables. The computer-executable instructions, when executed, further cause the apparatus to estimate an anticipated performance of the data modeling platform, generate an optimized tuning template based on the estimated anticipated performance, and automatically execute a performance tuning operation on the data modeling platform.

In some embodiments, the computer-executable instructions, when executed, further cause the apparatus to, after automatically executing the performance tuning operation on the data modeling platform, process a query using the data modeling platform.

In some embodiments, ingesting a target record from a particular data source includes storing a copy of the target record as a record in a particular stage table in the staging layer that corresponds to the particular data source, adding a set of standardized plumbing fields into the record, and applying the tuning template to the record to populate the set of standardized plumbing fields. In some such embodiments, the tuning template comprises a set of instructions for populating each of the set of standardized plumbing fields using values from one or more other fields in the copy of the target record.

In some embodiments, generating the data integration layer using the one or more stage tables comprises generating a data alignment table defining a desired set of data fields, and generating, using the one or more stage tables and the data alignment table, a key mapping table identifying correspondences between data fields in the one or more stage tables and data fields in the data alignment table. In some such embodiments, generating the data alignment table includes identifying, from within one of the one or more stage tables, a record having a unique combination of values for the desired set of data fields defined by the data alignment table, generating a new record in the data alignment table corresponding to the identified record, and populating fields in the data alignment table for the generated new record based on the unique combination of values.

In some embodiments, the data integration layer comprises a plurality of partitions, and estimating the anticipated performance of the data integration layer includes calculating a number of records in each partition in the data integration layer, determining, based on the number of records in each partition in the data integration layer, a degree of skew between partitions in the data integration layer, and estimating the anticipated performance of the data integration layer based on the determined degree of skew.

In some embodiments, the optimized tuning template comprises a tuning template that, when applied to all records in all stage tables in the staging layer, modifies all corresponding sets of standardized plumbing fields such that generating a data integration layer using the one or more stage tables will automatically performance-tune the data modeling platform.

In some embodiments, automatically executing the performance tuning operation on the data modeling platform comprises applying the optimized tuning template to all records in all stage tables in the staging layer to update all corresponding sets of standardized plumbing fields, and in response to applying the optimized tuning template, generating the data integration layer by the data modeling circuitry and using the one or more stage tables.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

FIG. 1 illustrates a diagram illustrating a typical system relying upon a data modeling platform.

DETAILED DESCRIPTION

Figure 2A:
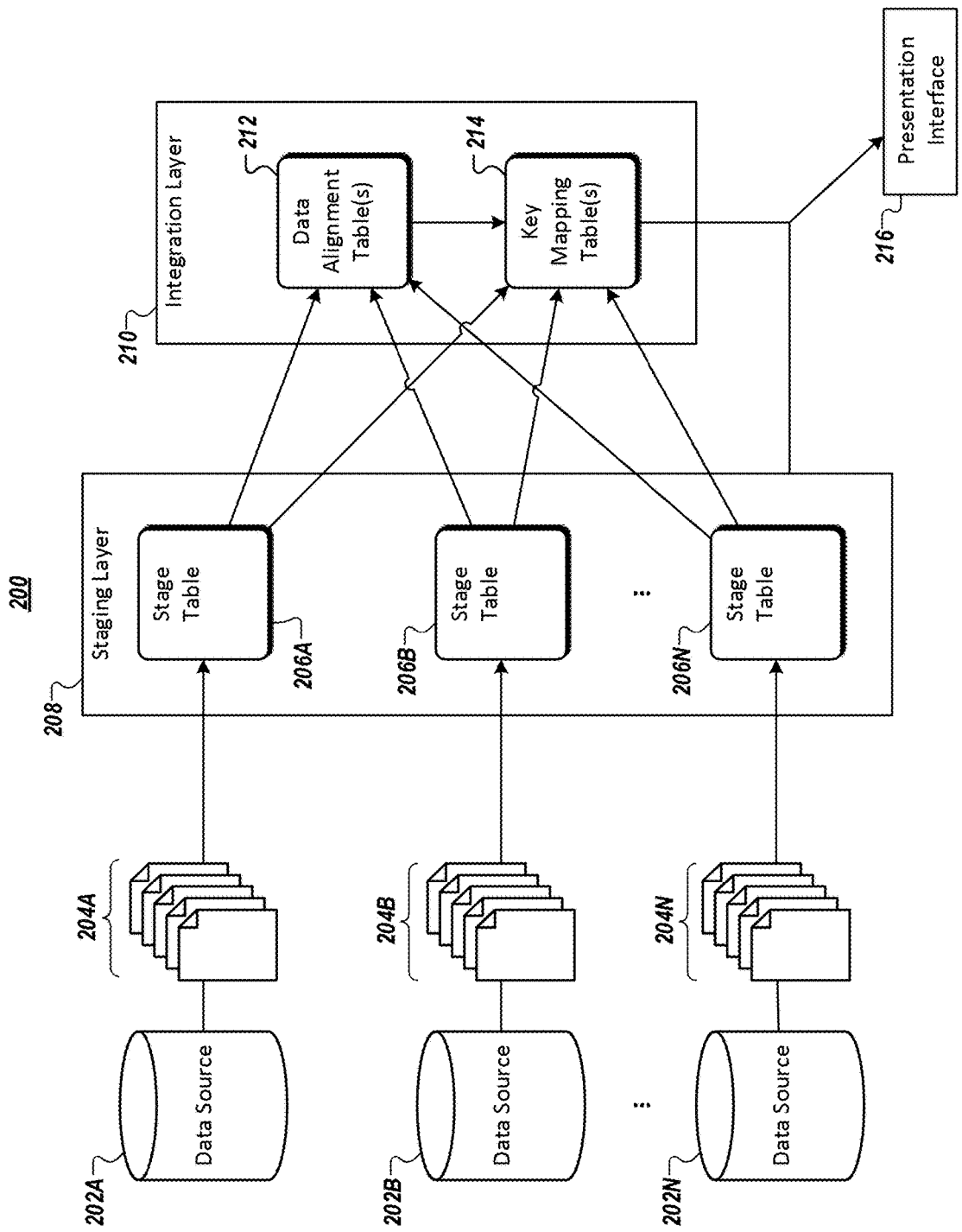
FIG. 2A illustrates a schematic diagram of an example data modeling platform, in accordance with some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

FIG. 1 provides a diagram illustrating a typical system 100 that uses a data modeling platform. As shown in FIG. 1, a series of users 102 may enter data at various times and/or places into various source systems 104. For instance, this data may comprise healthcare provider information regarding a particular patient who has visited a hospital and who has separately visited a doctor's office. The users 102 entering data about that patient may be the various nurses or doctors working at these two locations. Separately, a user 106 (who may, for instance, be another healthcare provider) may be interested in retrieving information about the patient from a presentation terminal 108 (e.g., a computer at the office of user 106). In a global system connected by a network 112 (e.g., the Internet), a host platform 110 may utilize various data modeling techniques designed to manage this process and provide the user 106 with relevant information retrieved from the disparate source systems 104.

However, as mentioned above, many traditional approaches for modeling the data from various source systems 104 present significant problems. Using traditional techniques, the host platform 110 may not be able to retrieve data from source systems 104 until it is known what information is important for the host platform 110. Many other traditional approaches introduce the possibility of encountering unrecoverable processing errors or are otherwise not designed to adequately respond to audits. Through the use of type-2 data warehousing, example embodiments disclosed herein provide solutions that can increase the efficiency and simplicity of data ingestion by a data modeling platform.

Turning to FIG. 2A, a schematic diagram is provided illustrating an example data modeling platform 200 in accordance with some example embodiments described herein. As shown in FIG. 2A, the data modeling platform 200 may retrieve one or more sets of records 204A-204N from a corresponding series of data sources 202A-202N. These sets of records may then be stored in corresponding stage tables (206A-206N) within a persistent staging layer 208 of the data modeling platform 200. It should be noted that, as opposed to traditional implementations that utilize a transient staging area, permanently persisting the staging layer facilitates both effective tracing of the data used by the data modeling platform 200 in the event of an audit, and also provides the data modeling platform 200 with the ability to address errors in processing that affect any source data received by the staging layer, regardless of when that source data was originally ingested (a problem that affects many traditional data modeling implementations is that errors may corrupt data that was received prior to some arbitrary retention window, rendering these errors unrecoverable).

Each stage table 206 may comprise a type-2 data warehouse, ensuring that each change to a record will be stored in the stage table 206 as a new record and will not overwrite the old version of the record. Permanently persisting records ensures that changes in the records represented by each stage table 206 can be tracked independently from the information contained in any other tables, because any pointers to a previously stored version of a record will not be affected by the storage of a new record (in contrast, physical replacement of an old version of a record with a newer version of that record may cause problems for other tables having pointers to the old version of the record). Accordingly, updating a stage table 206 requires no pre-planning or knowledge. Moreover, the source data can remain entirely unprocessed once ingested and, in some embodiments, it may never be moved after its initial entry into the staging layer.

It should be noted that upon initial receipt of each record from a data source 202, the record will be stored in a stage table 206 corresponding to the data source 202 from which it was received, and the copied record will be modified by the data modeling platform 200 to include one or more standardized plumbing fields that track changes in the record over time. It will be understood that each data source can be interrogated periodically or on an ad hoc basis. For instance, the records contained in the data sources may be retrieved every night and imported into the staging layer for subsequent integration and utilization into the data model as soon as the following day. As another example, the records contained in the data sources may be retrieved and integrated into the data model at times of particularly low data utilization.

It should be appreciated that by defining the data integration needs of the data modeling platform 200 independently of the data ingestion aspects of the data modeling platform 200, source data can be collected in the staging layer without a complete accounting of the needs of the data model, and there is no need to delay this data collection even if the requirements of the data model are not yet known. Accordingly, ingestion of data into the staging layer may occur in parallel with any JAD sessions, or the ingestion of data may even occur beforehand. In such fashion, example embodiments contemplated herein can therefore reduce the total time required to initialize the data model.

An integration layer 210 is illustrated in FIG. 2A, and the data modeling platform 200 may integrate the data from the staging layer in a wide variety of ways. As one example, the integration layer 210 may comprise a set of data alignment tables 212 in connection with a set of key mapping tables 214, as described in connection with FIG. 2A of U.S. patent application Ser. No. 15/086,266, filed Mar. 31, 2016, the entire contents of which are herein incorporated by reference. In such an example, each data alignment table 212 has a desired set of data fields. The data fields required for each data alignment table may be determined in JAD sessions (and, as noted elsewhere, these JAD sessions may or may not occur in parallel with the ingestion of data) and may be based on the semantics, modeling, or reporting needs of the data model. Data alignment tables that identify natural attributes (e.g., business keys) of certain atomic parts of the business (e.g., customers, employees, or the like) may be referred to herein as domain tables, while data alignment tables that identify the natural attributes of transactions between domains represented by domain tables (e.g., how often customers interacted with employees, when customers interacted with employees, etc.) may be referred to herein as relator tables. In this regard, domain tables are similar to data vault hubs and relator tables are similar to data vault links. As one example, a user may be interested in knowing the set of persons mentioned in data retrieved from the various data sources of a data model. To do this, a data alignment table 212 (e.g., data alignment table 346, shown in FIGS. 2B and 2C) may be created having the particular set of data fields needed to uniquely identify each person for the organization implementing the data model.

In the integration layer 210, the data modeling platform 200 also stores one or more key mapping table(s) 214 corresponding to a respective data alignment table 212 (it will be appreciated that while FIG. 2A illustrates only a single element illustrating the data alignment table(s) 212 and a single element identifying the key mapping table(s) 214 for ease of illustration, additional data alignment tables 212 and key mapping tables 214 may be included in the integration layer 210 as appropriate to accurately model the needs of the organization). Each key mapping table 214 acts as a bridging layer between a corresponding data alignment table 212 and the underlying stage tables 206A-206N. Thus, each key mapping table 214 contains a series of references to the data in stage tables 206A-206N. For a particular type of information tracked by a first data alignment table 212, the corresponding field in a first stage table 206A may be different than the corresponding field in a second stage table 206B, so the key mapping table 214 will include a pointer to the location of the particular information in first stage table 206A and another pointer to the location of the particular information in the second stage table 206B. It will be understood that the use of pointers illustrated in this fashion comprises a "flyweight" design pattern because the use of references to data (e.g., pointers) avoids the need to copy the data itself.

As an example, a particular data alignment table 212 may comprise a domain table defining the required information regarding patients. The domain table may include fields for a first, middle, and last name of each patient identified in one of the stage tables 206A-206N. The data modeling platform 200 may, in response to generation of the domain table, generate a key mapping table that includes a pointer to the field in each stage table 206 that will store each individual's first name, a separate pointer to the field that will store each individual's middle name, and a third pointer to the field that will store each individual's last name. In this fashion, the key mapping table 214 can be thought of as a bridging layer that links the domain table with the staging layer.

The data modeling platform 200 may also provide a separate presentation interface 216 to provide users with responses to queries of the data model made by various users (e.g., user 106). This presentation interface 216 may be the only interface visible to the querying users, as the tables contained in the staging layer and integration layer information need not be visible to users despite being used to generate data responsive to user queries. To provide this information, the data modeling platform 200 may retrieve identifying data from a given data alignment table (e.g., a domain or relator table) and may retrieve describing data from a given stage table. The data alignment table and the stage table are linked via the key mapping table.

Figure 2B:
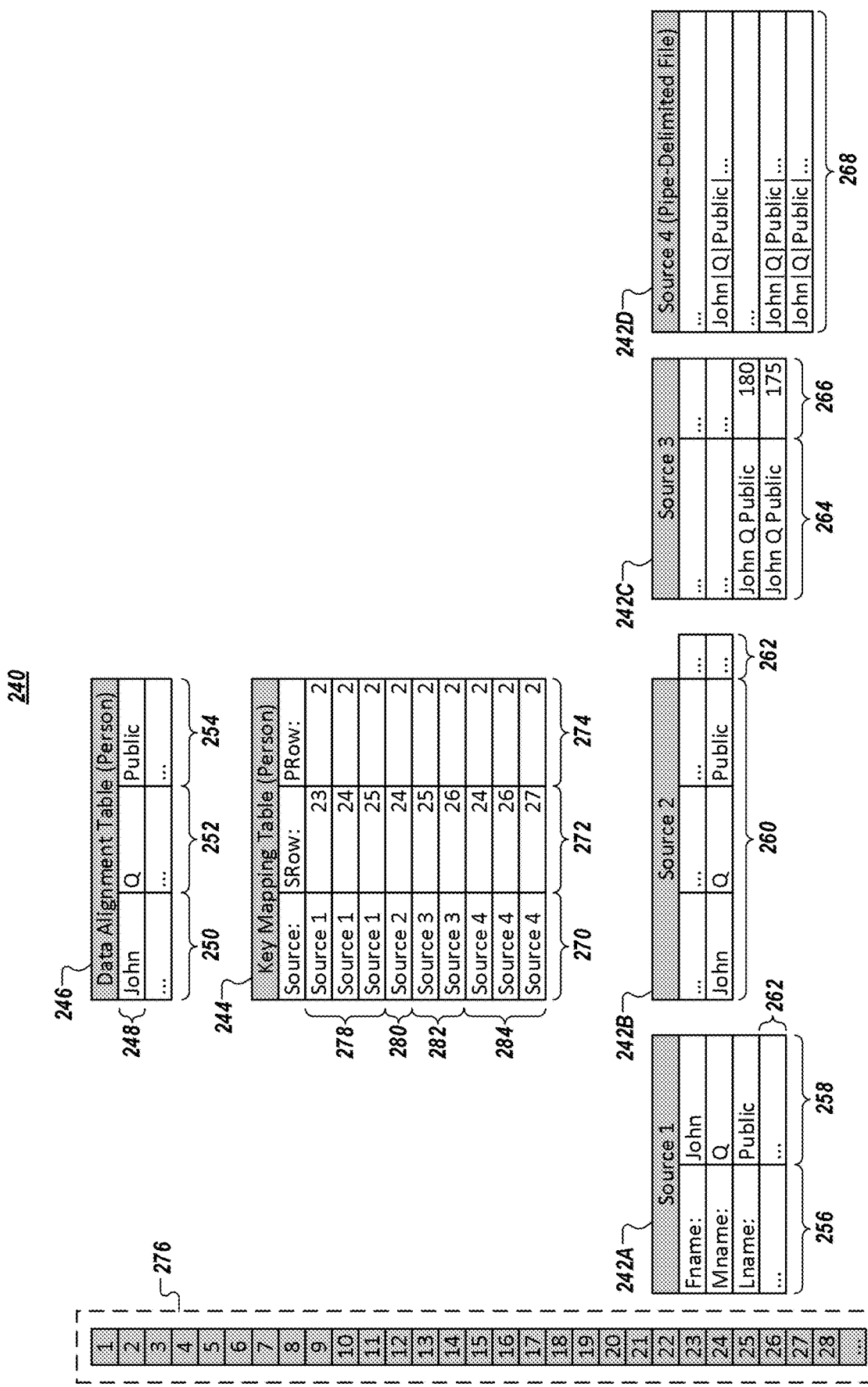
FIG. 2B illustrates a representation of an example data model that may be used by some example embodiments described herein.
Figure 2C:
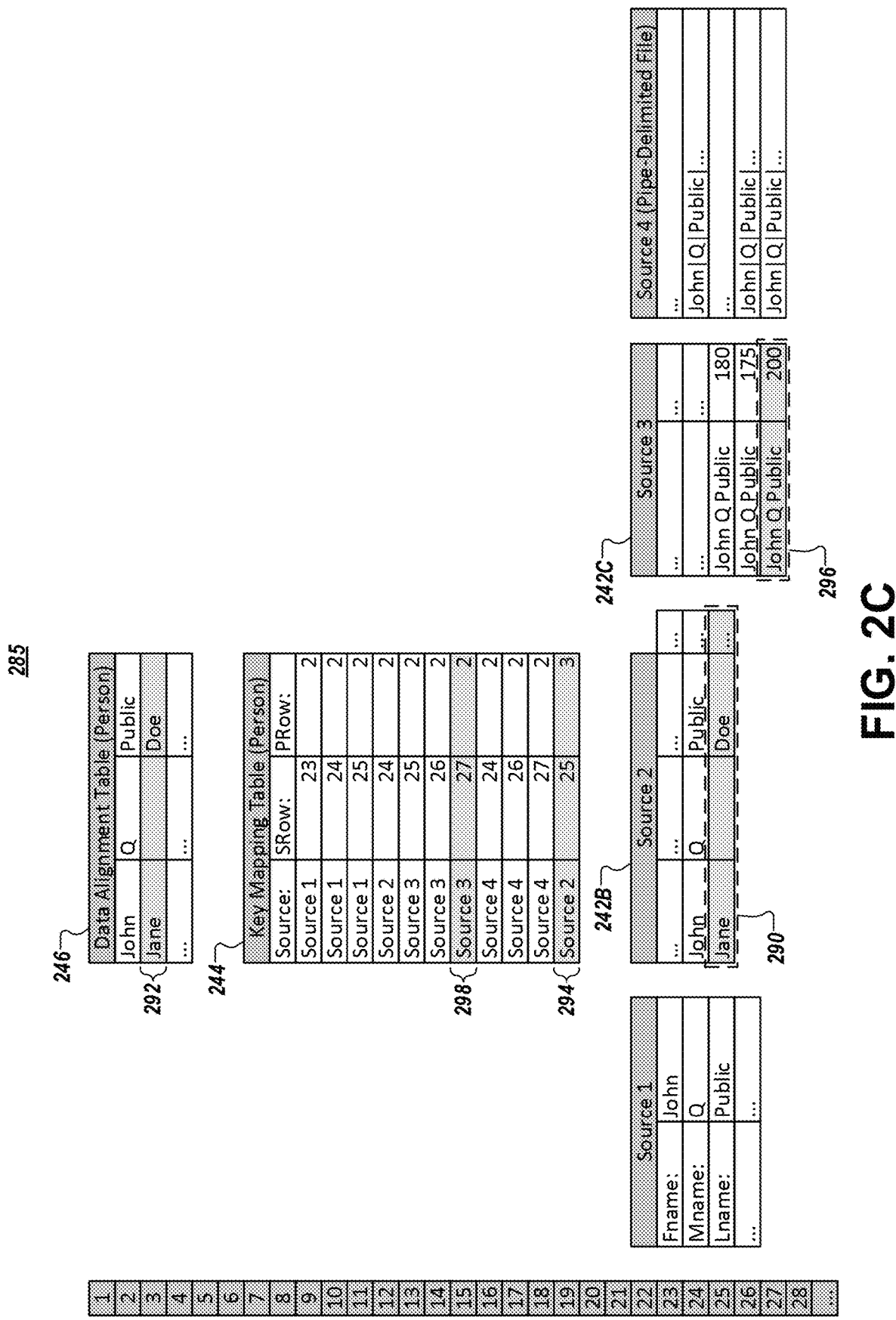
FIG. 2C illustrates a revised representation of the example data model of FIG. 2B after the addition of new records to a data source.

Illustration of the manner by which the data modeling platform 200 ingests data may be better understood in connection with FIGS. 2B and 2C, and further in connection with FIGS. 3A-3D. FIG. 2B discloses a first state of the data model, and FIG. 2C, in turn, illustrates how changes to the data contained in data sources can be introduced into the data model.

Turning first to FIG. 2B, representation 240 illustrates a series of stage tables 242A-242D, a key mapping table 244, and a data alignment table 246. Data alignment table 246 identifies three pieces of information relating to each distinct person 248 identified in the source data: the person's first name 250, middle name 252, and last name 254. In this example, as may often be the case in real-world scenarios, stage tables 242A-242D represent this information in different ways.

Stage table 242A, for instance, includes an initial column 256 defining the fields storing the related information, and a subsequent column 258 that includes the corresponding information for person 248. Stage table 242B, however, stores each record on its own row, and the information corresponding to person 248 is stored in the fields shown by bracket 260. In turn, brackets 262 illustrate that stage tables 242A and 242B also include additional fields associated with the person 248. These additional fields may include information that is not relevant to the data alignment table 246, but may also include additional plumbing fields that facilitate the tracking of changes over time (these plumbing fields are described in greater detail below). Stage table 242C represents the information from person 248 in yet another way, with all identifying information in a single field 264. In addition, stage table 242C stores additional information regarding person 248 (his weight) in the fields in column 266. Notably, stage table 242C includes multiple records corresponding to John Q Public. Although there is no bracket 262 shown in stage table 242C, it will be understood that stage table 242C will include plumbing fields for each of the records in similar fashion as stage tables 242A and 242B. Finally, stage table 242D may comprise a pipe delimited file, in which all of the information for each record is contained in a single field 268, with each distinct piece of information about the person separated by a "|" character.

The key mapping table 244 may then comprise a series of pointers to the data contained in stage tables 242A-242D and the distinct persons identified in the data alignment table 246. The first column of the key mapping table (270), titled "Source:", references a particular stage table, while the second column of the key mapping table (272), titled "SRow:", references a particular row in that stage table. The third column of the key mapping table (274), titled "PRow:", references a particular row of the data alignment table corresponding to the information referenced in columns 270 and 272. It will be understood, in this regard, that the "row" referenced in the data fields in column 272 and 274 reference the numbered rows shown in box 276. Thus, as illustrated by bracket 278, person 248 is referenced in three rows of stage table 242A (rows 23, 24, and 25) and row 2 of data alignment table 246. Similarly, bracket 280 shows that person 248 is referenced in a single row of stage table 242B (row 24). Bracket 282 shows that person 248 is referenced in two rows of stage table 242C (rows 25 and 26). Finally, bracket 284 shows that person 248 is referenced in three rows of stage table 242D (rows 24, 26, and 27).

FIG. 2C then illustrates a new representation, 285, showing how ingestion of new data from data sources can affect the data model. In the example shown in FIG. 2C, the data source corresponding to stage table 242B has transmitted a new record referencing a new person, Jane Doe. The receipt of this new record thus introduces a new record 290 into the stage table 242B. In turn, introduction of a new distinct person into the data model propagates a change to the data alignment table 246, which therefore includes a new line item 292 corresponding to the new person. Furthermore, the key mapping table thus includes a new row 294 linking the new data in stage table 242B with the new distinct person identified in data alignment table 246.

Similarly, in the example of FIG. 2C, the data source corresponding to stage table 242C has transmitted a revised record corresponding to person 248 (John Q Public). Because stage table 242C is a type-2 data warehouse, the prior record is not overwritten, and instead the receipt of this revised record thus introduces a new record 296 into the stage table 242C. Because this new record does not represent a new distinct person, it does not cause any change to the data alignment table 246. However, the key mapping table is modified to include a new row 298 linking the new data in stage table 242C with the preexisting person identified in data alignment table 246.

Figure 3A:
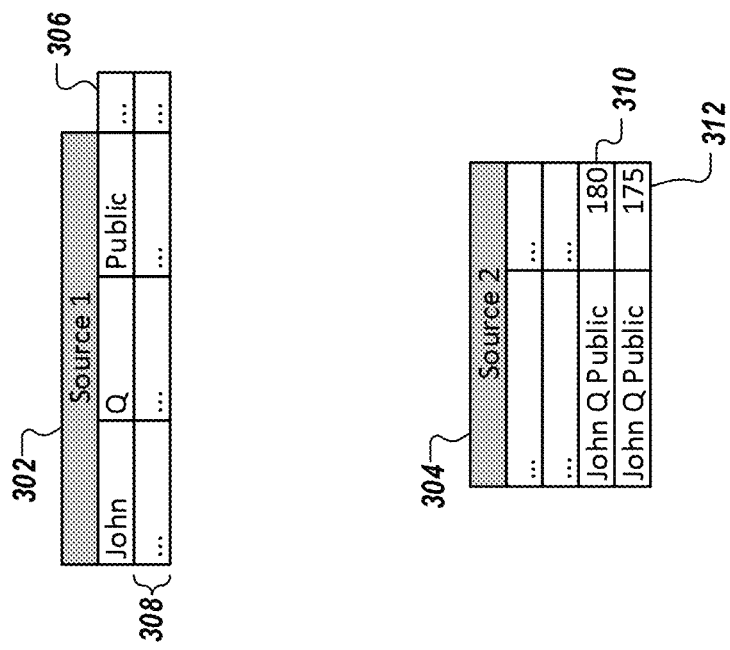
FIG. 3A illustrates example data source tables that may be used by some example embodiments described herein.
Figure 3B:
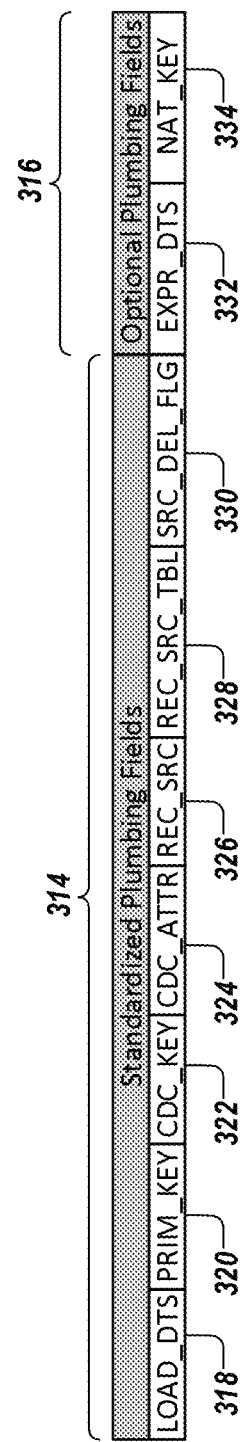
FIG. 3B illustrates a default set of standardized plumbing fields and a separate set of optional plumbing fields, in accordance with some example embodiments described herein.
Figure 3C:
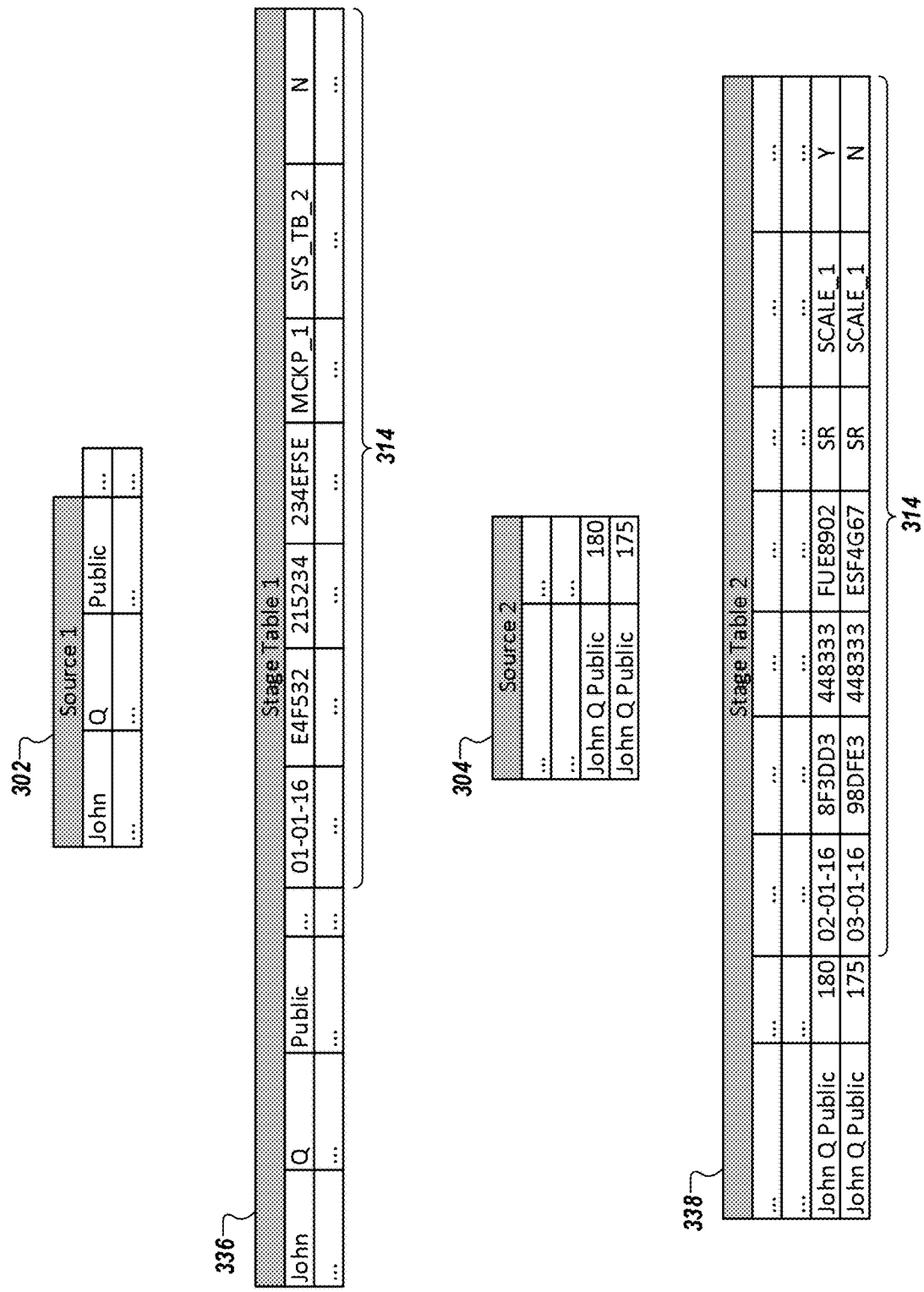
FIG. 3C illustrates an example stage table after ingestion of records from the source tables shown in FIG. 3A, in accordance with some example embodiments described herein.
Figure 3D:
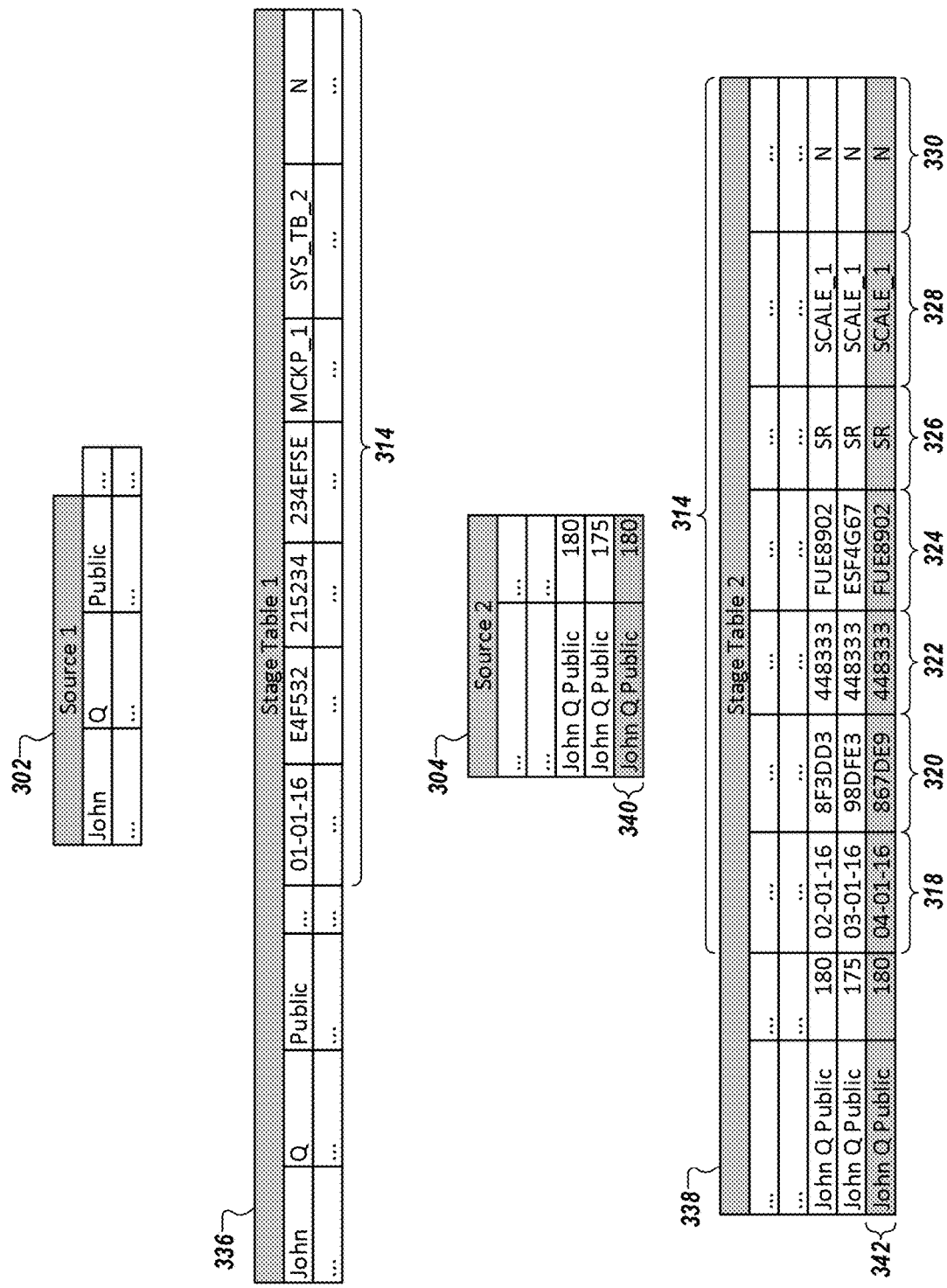
FIG. 3D illustrates another example stage table after ingestion of records from source tables, in accordance with some example embodiments described herein.

Turning next to FIGS. 3A-3D, additional detail regarding the addition of standardized plumbing fields to records ingested into a staging layer. To this end, FIG. 3A illustrates two example data source tables, FIG. 3B illustrates an example set of standardized plumbing fields utilized in connection with staging of ingested source data, FIG. 3C illustrates an example of two stage tables that have ingested the records from the source tables illustrated in FIG. 3A and that have incorporated the standardized plumbing fields illustrated in FIG. 3B, and FIG. 3D provides another example of two stage tables that have ingested records from source tables.

Turning first to FIG. 3A, two example data source tables are shown: source table 302 (labeled "Source 1") and source table 304 (labeled "Source 2"). Source table 302 illustrates only a single record and illustrates three fields of that record "John", "Q", and "Public". However, as shown by field 306, this first record may have additional fields that are simply not relevant to this example (for instance, any additional fields may be non-primary key data fields). Further, as shown at row 308, this source table 302 may include additional records that are not shown in FIG. 3A for clarity of illustration.

Where source table 302 included one record, source table 304 illustrates two records, each of which has two fields. The first record has a field holding the string "John Q Public" and a second field 310 having a value of "180", which in this example illustrates the weight of John Q Public as of storage of the first record. Similarly, the second record is also a record regarding "John Q Public" but field 312 has a value of "175," indicating that John Q Public weighed less upon storage of the second record. Ingestion of the data contained in these two data sources will be described below in connection with FIGS. 3B and 3C.

Turning first to FIG. 3B, an illustration is provided of a default set of standardized plumbing fields 314 for use by data modeling platform 200, and a separate set of optional plumbing fields 316 that may be included as elements of the standardized plumbing fields in some embodiments contemplated herein. It will be understood that the standardized set of plumbing fields may utilize data concatenation to populate the standardized plumbing fields. In this regard, a list of data from a given set of fields in a given data set may be concatenated (e.g., in order of appearance), and delimited by a standard non-alphanumeric character (or characters) (e.g., '~', '|:|', or the like) for storage in one of the standardized plumbing fields. Similarly, the standardized set of plumbing fields may additionally utilize hashing methods on a given concatenation to produce an output having a higher degree of uniqueness (in this regard, hashing methods that may be used include MD5, Secure Hash Algorithm 1 (SHA-1), or the like). In addition to producing plumbing fields having high degrees of uniqueness, the use of concatenation and hashing in this fashion makes record comparisons simpler, as concatenations or hashes from single data fields can be compared to each other more easily than a plurality of separate fields from one record could be compared to a plurality of fields from another record.

The standardized plumbing fields may, in many embodiments, be populated based on a tuning template. To this end, it will be understood that the term "tuning template," as used herein, refers to a set of instructions for populating each of the set of standardized plumbing fields using values from one or more other fields in the copy of the target record. More specifically, a tuning template may specify which other fields are to be used to generate the value of a given standardized plumbing field.

In some embodiments, the standardized plumbing fields may include a field 318 that stores a date/time stamp (which may be referred to as LOAD_DTS) identifying a date/time that the record containing the date/time stamp was ingested into the staging layer. Based on the frequency of addition of records to the data modeling platform, a default tuning template may select a date stamp having a particular degree of particularity (e.g., it may specify time stamp comprising the hour and minute of ingestion of a record, or it may specify an hour, minute, and second of ingestion). In contrast, an optimized tuning template may identify an appropriate degree of specificity of the date/time stamp based on the expected frequency with which records are added to the data modeling platform (e.g., if records are added multiple times a second, then tracking milliseconds may be necessary to avoid collisions, whereas if records are only added once a week, then tracking hours and minutes may be overkill). The standardized plumbing fields may also include a field 320 that may be referred to as a warehouse (or stage table) primary key (e.g., PRIM_KEY), which may comprise a hash of all of the source data fields and the LOAD_DTS field. The benefit of this PRIM_KEY field is that it is exceedingly likely that it will be globally unique (as a result of incorporating the LOAD_DTS date/time stamp into the hash). The benefit of having a globally unique key of this nature is that it can ensure that non-duplicate data is always ingested into the staging layer. Without the use of a globally unique key, it is possible that some records that only appear to be duplicates of existing records may be discarded instead of being ingested into the staging layer). Accordingly, while the methodology used for identifying a value of the PRIM_KEY field is nominally subject to change via a tuning template, the PRIM_KEY field likely will typically be calculated in this fashion.

In some embodiments, the standardized plumbing fields may also include a field 322 comprising a source primary key (e.g., CDC_KEY). A default tuning template may comprise an instruction to assign a value to the CDC_KEY field such that the value comprises a hash of the source primary key data fields. The source primary key data fields are a subset of all of the source data fields that together uniquely identify a record within that source table. However, in some examples, it may be the case that the set of the source primary key data fields used to calculate the CDC_KEY in one embodiment is either over- or under-inclusive, and a more accurate set of keys can be used to uniquely identify a record or causes a collision with the CDC_KEY of a table from an unrelated source. An optimized tuning template may identify a different arrangement of source data fields to use for the generation of a CDC_KEY. In addition, the standardized plumbing fields may include a source attribute data field 324 (e.g., CDC_ATTR), which comprises a hash of source non-primary key data fields. This field enables the system to identify when a unique record has been modified. Moreover, the standardized plumbing fields may include a source name field 326 (e.g., REC_SRC) that identifies the name of the system of record, and may also include a source data set name field 328 (e.g., REC_SRC_TBL) that identifies the name of the table or file within the system of record. Between the REC_SRC and REC_SRC_TBL fields, the plumbing fields will be able to uniquely identify the data source from which the corresponding data is retrieved with granular particularity. The CDC_ATTR, REC_SRC, and REC_SRC_TBL are also subject to modification based on the tuning template applied in a given instance. Finally, the standardized plumbing fields may include a source delete flag field 330 (e.g., SRC_DEL_FLG), which may display "Y" or "N" depending on whether the corresponding record in the data source has been physically deleted. The SRC_DEL_FLG plumbing field 330 ensures accuracy of the data stored in the staging layer, as it ensures that records that have been deleted in the data source will not still be utilized for data modeling.

While the above fields are sufficient to usefully ingest most types of records encountered from most data sources, in some optional embodiments the standardized plumbing fields may include optional plumbing fields 316, typically for performance or testing reasons. In this regard, these optional plumbing fields may include an expiry field 332 identifying a date/time when a corresponding record was overwritten (which may be referred to as EXPR_DTS). For a current record, this plumbing field may, however, either be null or list 12/31/9999 or another similar indicator when the record has not been overwritten yet. It should be understood that the information represented by the EXPR_DTS field can be derived on the fly using SQL analytics functions (e.g., LEAD(load_dts) OVER (PARTITION BY cdc_key ORDER BY load_dts). However, despite the ability to derive the value of this field from other fields, use of the EXPR_DTS field can reduce the processing time needed for certain queries significantly (e.g., a query for lab results in embodiments not using the EXPR_DTS field could result in a search of millions of records, while a search for lab results that have not expired could conclude much more quickly as it would evaluate a much smaller sample size). Another optional field for the standardized set of plumbing fields may comprise a source natural key field 334 (which may be referred to as NAT_KEY), which may comprise a hash of source natural key data fields (e.g., the natural attributes, or business keys included in the record from the data source). The value of this NAT_KEY field is that it can provide another unique key that can avoid any issues caused by, for instance, CDC_KEY collisions (which, while theoretically impossible, sometimes occur due to data entry errors in data sources). As with the other standardized plumbing fields, the EXPR_DTS and NAT_KEY fields may also be subject to change based on the instructions set forth in the tuning template being applied in a given instance.

Turning now to FIG. 3C, an illustration is shown of stage tables 336 and 338 demonstrating the ingestion of the records stored in source tables 302 and 304, respectively. In addition, stage tables 336 and 338 also include the addition of the set of standardized plumbing fields 314, as can be seen by their differences from the source tables 302 and 304. Particular example values are shown for each of the fields in the standardized plumbing table, although these values are shown only as a means for illustrating the manner by which stage table records are generated from source table records (and not to suggest some particular manner of calculating the values that are shown within any of the various fields). Because data modeling platforms need to consistently track any type of change from any type of data source, the use of standardized plumbing fields in this fashion avoids the need for the data modeling platforms to maintain any source-specific plumbing fields, or employ any methods that would be required to handle such needs on a case by case basis. Similarly, example embodiments utilizing standardized plumbing fields avoid the need for multiple data tracking logic to maintain, monitor, and support the staging layer. Similarly, standardization of the plumbing fields avoids any job scheduling issues inherent to such maintenance, monitoring and support.

Turning next to FIG. 3D, another example illustration is shown of stage tables 336 and 338 to highlight the utility of the PRIM_KEY plumbing field. As shown in FIG. 3D, source table 304 has been modified to include a new record 340, which appears identical to the first listed record (it lists a weight 180). Although this new record 340 includes effectively identical attribute data as the first record, this new record carries new information insofar as it illustrates that John Q Public had regained the 5 pounds he had lost at the time of collection of the second record. Despite conveying new information regarding the weight fluctuation of John Q Public, there is a risk that this new risk would not be stored in stage table 338 because it will include identical CDC_KEY 322 and CDC_ATTR 324 plumbing fields as the first record. To account for this potential issue, the PRIM_KEY plumbing field 320—which incorporates all data fields of the source record as well as the LOAD_DTS 318 field—conveys that this new record 340 is, in fact, a different record from the first record. Specifically, because the LOAD_DTS of the first record is different from the LOAD_DTS corresponding to the new record 340, the PRIM_KEY for the first record is necessarily different from the PRIM_KEY of the new record 340. In turn, FIG. 3D illustrates that the new record is stored in stage table 338 as record 342. As this example illustrates, the inclusion of the PRIM_KEY plumbing field 320 as one of the standardized plumbing fields may prevent the failure to store a new record from a data source into a corresponding stage table.

Accordingly, by introducing standardized plumbing fields into data tables in used for the ingestion of data from one or more data sources, example embodiments provide a staging layer that is highly configurable for subsequent data integration operations. Moreover, because the data integration layer itself comprises a flyweight design, it, too, is highly configurable without significant overhead expense. Ultimately, this degree of configurability removes the need for costly data transformations simply for performance tuning, and permits the design and automated implementation of global performance-tuning modifications to the data sets represented by the data modeling platform.

System Architecture

Methods, apparatuses, and computer program products of the present invention may be embodied by any of a variety of devices. Example embodiments may include a plurality of devices operating in a globally-networked system. In doing so, example embodiments may utilize any of a variety of fixed terminals, such as desktop computers, mainframe devices, kiosks, or the like. Similarly, example embodiments may also utilize any of a variety of mobile terminals, such as a portable digital assistant (PDA), mobile telephone, smartphone, laptop computer, tablet computer, or any combination of the aforementioned devices.

Figure 4:
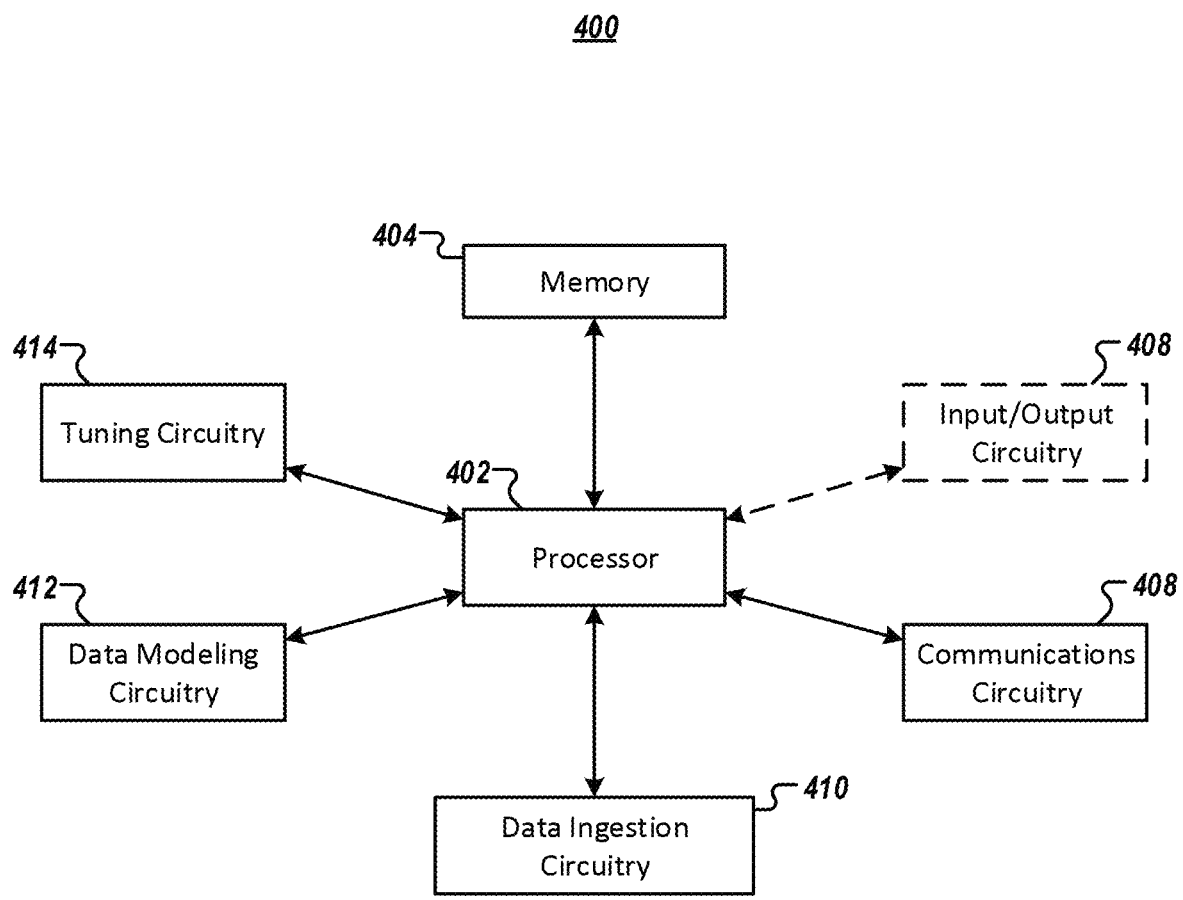
FIG. 4 illustrates a schematic block diagram of example circuitry embodying a device that may perform operations in accordance with some example embodiments described herein.

Turning to FIG. 4, an example apparatus 400 is illustrated that may represent a basic set of components of a device embodying an example system. The apparatus 400 may include a processor 402, a memory 404, and communications circuitry 408. In some embodiments, the device may further include input/output circuitry 406 for interacting with a user, a data ingestion circuitry 410 for receiving and staging data in a staging layer, data modeling circuitry 412 for populating the data model based on the staged data, and tuning circuitry 414 for estimating an anticipated performance of the data integration layer and generating an optimized tuning template based on the estimated anticipated performance of the data integration layer. The apparatus 400 may be configured to execute the operations described below in connection with FIGS. 5-8. Although these components 402-414 are described with some functional descriptors, it should be understood that the particular implementations necessarily include the use of particular hardware. It should also be understood that certain of these components 402-414 may include similar or common hardware. For example, the data ingestion circuitry 410, data modeling circuitry 412, and tuning circuitry 414 may leverage use of the processor 402, memory 404, or communications circuitry 408, to perform their associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor 402. Alternatively or additionally, the processor 402 may be configured to execute hard-coded functionality. As such, whether configured by hardware or software methods, or by a combination of hardware with software, the processor 402 may represent an entity (e.g., physically embodied in circuitry) capable of performing operations according to an embodiment of the present invention while configured accordingly. Alternatively, as another example, when the processor 402 is embodied as an executor of software instructions, the instructions may specifically configure the processor 402 to perform the algorithms and/or operations described herein when the instructions are executed.

In some embodiments, the memory 404 may be non-transitory and may include, for example, one or more volatile and/or non-volatile memories. In other words, for example, the memory 404 may be an electronic storage device (e.g., a computer readable storage medium). The memory 404 may be configured to store information, data, content, applications, instructions, or the like, for enabling the apparatus to carry out various functions in accordance with example embodiments contemplated herein.

In some embodiments, the apparatus 400 may include input/output circuitry 406 that may, in turn, be in communication with processor 402 to provide output to a user and, in some embodiments, to receive an indication of user input. The input/output circuitry 406 may comprise a user interface and may include a display that may include a web user interface, a mobile application, a client device, or the like. In some embodiments, the input/output circuitry 406 may also include a keyboard, a mouse, a joystick, a touch screen, touch areas, soft keys, a microphone, a speaker, or other input/output mechanisms. The processor 402 and/or the input/output circuitry 406 comprising the processor 402 may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communication circuitry 408 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In addition, the apparatus 400 may also comprise data ingestion circuitry 410, which includes hardware components designed to facilitate the retrieval and staging of data in a staging layer of the data modeling platform. Data ingestion circuitry 410 may utilize processing circuitry, such as the processor 402, to facilitate performance of its various operations, and may utilize memory 404 to store state computer instructions that, when executed, cause the data ingestion circuitry 410 to perform those operations. Data ingestion circuitry 410 may further utilize communications circuitry 406 to receive data from a variety of data sources.

In addition, the apparatus 400 may also comprise data modeling circuitry 412, which includes hardware components designed to populate the data model based on the staged data. Data modeling circuitry 412 may utilize processing circuitry, such as the processor 402, to facilitate performance of its various operations, and may utilize memory 404 to store state computer instructions that, when executed, cause the data modeling circuitry 412 to perform its operations.

Still further, the apparatus 400 may also comprise tuning circuitry 414, which includes hardware components designed to estimate an anticipated performance of the data integration layer of a data modeling platform, and generate an optimized tuning template based on the estimated anticipated performance of the data integration layer. Tuning circuitry 414 may utilize processing circuitry, such as the processor 402, to facilitate performance of its various operations, and may utilize memory 404 to store state computer instructions that, when executed, cause the tuning circuitry 414 to perform its operations.

It should be appreciated that, in some embodiments, data ingestion circuitry 410, data modeling circuitry 412, and/or tuning circuitry 414 may include a separate processor, specially configured field programmable gate array (FPGA), or application specific interface circuit (ASIC) to perform their above-described functions. Data ingestion circuitry 410, data modeling circuitry 412, and/or tuning circuitry 414 are therefore implemented using hardware components of the apparatus 400 that are configured by either hardware or software for implementing their planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 400) that may be utilized to implement some embodiments of the data modeling platform 200 described above, example embodiments of the present invention are described below in connection with a series of flowcharts that, when implemented, provide for automated performance tuning of a data modeling platform.

Operations for Automated Performance Tuning of a Data Modeling Platform

Figure 5:
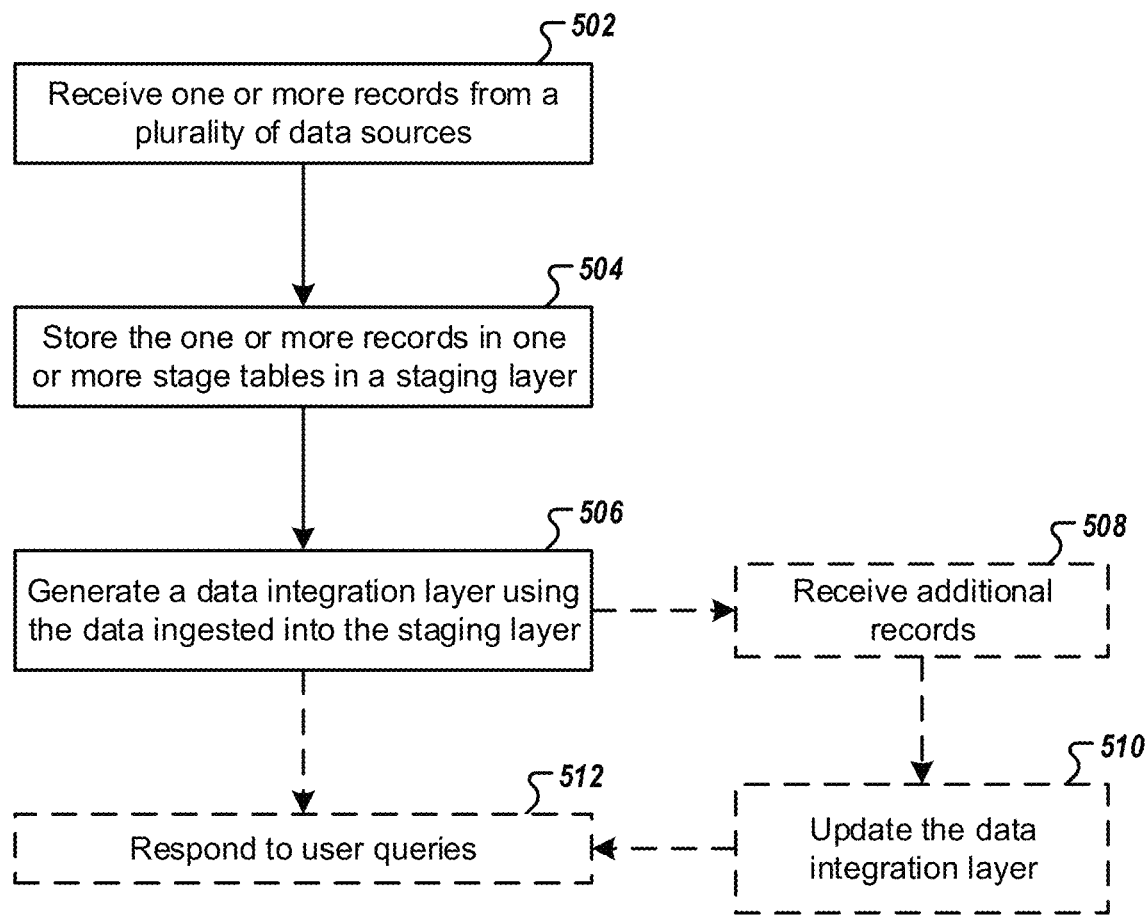
FIG. 5 illustrates a flowchart describing example operations performed by a data modeling platform to improve data ingestion in a data modeling platform, in accordance with some example embodiments described herein.
Figure 6:
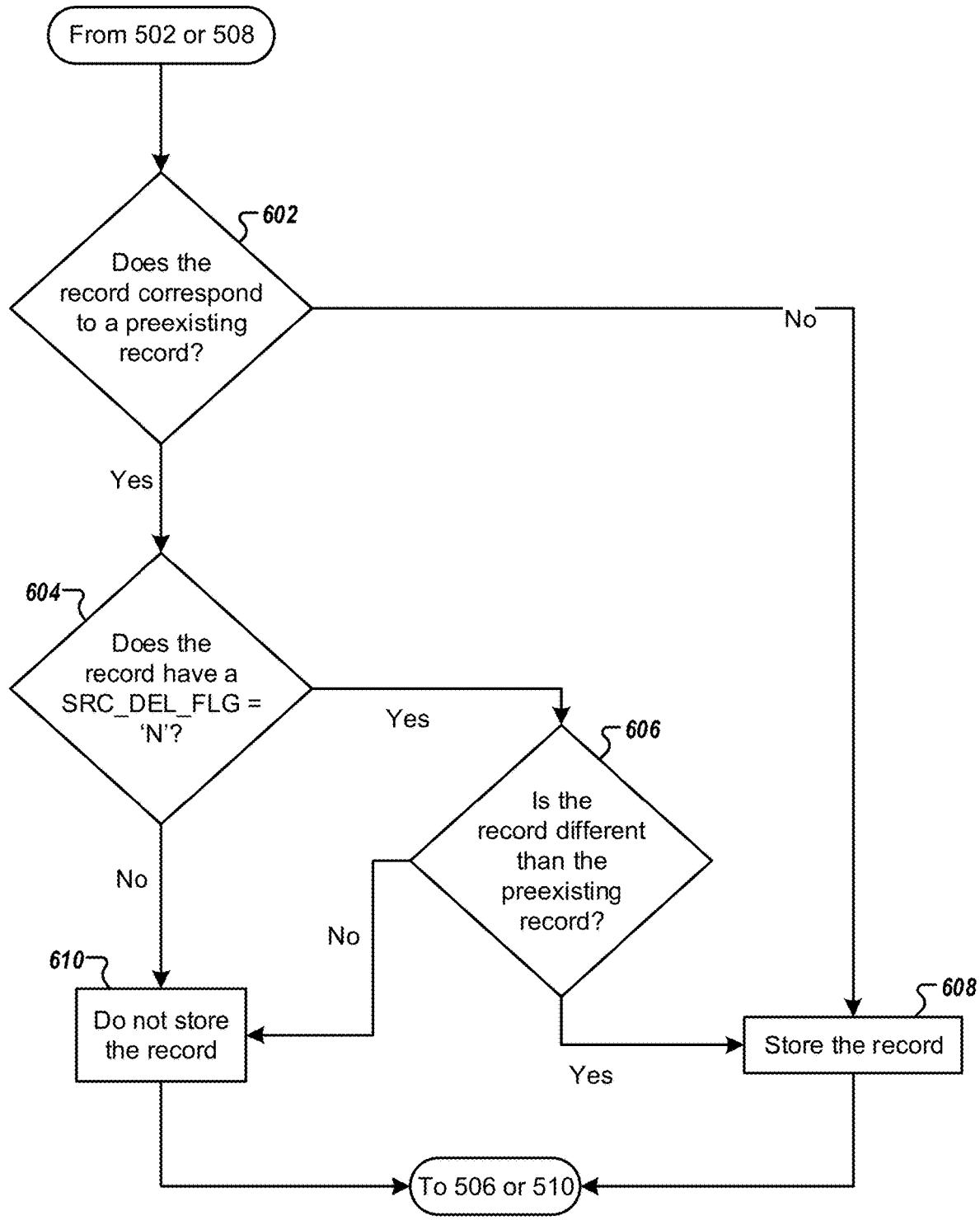
FIG. 6 illustrates a flowchart describing example operations for analyzing inbound records and determining whether to store them in the staging layer, in accordance with some example embodiments described herein.
Figure 7:
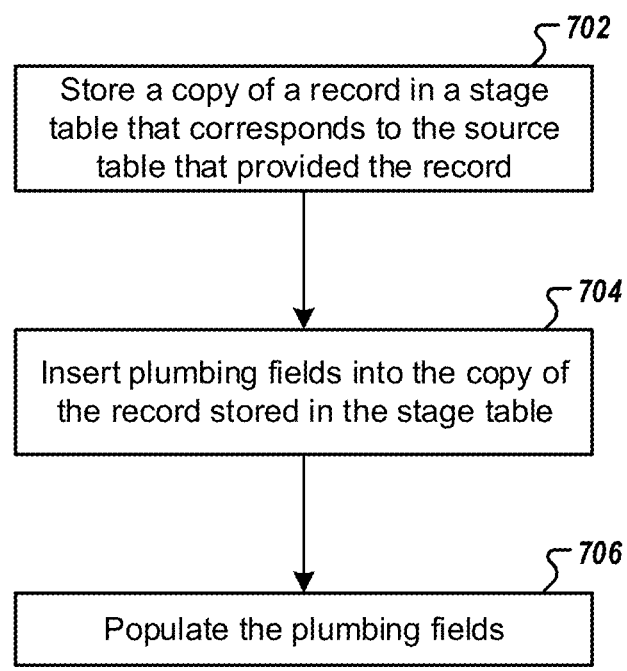
FIG. 7 illustrates a flowchart describing example operations for storing a target record that is received from a particular data source, in accordance with some example embodiments described herein.

Turning to FIGS. 5, 6, and 7, flowcharts are illustrated that contain operations to improve data ingestion in a data modeling platform and, thereby, facilitate the automated performance tuning of the data modeling platform. The operations illustrated in FIGS. 5, 6, and 7 may, for example, be performed by, with the assistance of, and/or under the control of an apparatus 400 embodying a device operatively controlling a data modeling platform 200 and more particularly through the use of one or more of processor 402, memory 404, input/output circuitry 406, communications circuitry 408, data ingestion circuitry 410, data modeling circuitry 412, and/or tuning circuitry 414.

Turning first to FIG. 5, example operations are provided for improved data ingestion in a data modeling platform. To begin with, the apparatus 400 includes means, such as data ingestion circuitry 410 or the like, for ingesting, using a set of standardized plumbing fields comprising descriptive fields including a stage table primary key field, a source primary key field, and a source attribute field, one or more records from a plurality of data sources into one or more stage tables in a staging layer. This data ingestion operation may include two sub-steps: receiving the one or more records and storing the one or more records, as discussed in connection with operations 502 and 504.

As shown in operation 502 the apparatus 400 includes means, such as input/output circuitry 406, communications circuitry 408, data ingestion circuitry 410, or the like, for receiving one or more records from the plurality of data sources. Each data source may correspond to a separate business entity in some embodiments. For instance, one data source may comprise patient records from a hospital, while another data source may be patient records from a particular doctor's office, and a third data source may comprise an insurer's patient records. In other embodiments, multiple data sources may correspond to the same business entity. As mentioned previously, the one or more records may be retrieved from the plurality of data sources on a periodic basis (e.g., every night), on a less regular basis as determined by system utilization (e.g., data is retrieved in a batch process whenever utilization of the data modeling platform 200 is below some predetermined threshold), on an event-driven basis, or the like.

In operation 504 the apparatus 400 includes means, such as memory 404, data ingestion circuitry 410, or the like, for storing the one or more records in one or more stage tables in a staging layer. Each of the one or more stage tables corresponds to one of the plurality of data sources. Moreover, each of the one or more stage tables comprises a type-2 data warehouse and each record in each of the one or more stage tables is altered to include a set of standardized plumbing fields, as described previously in connection with FIGS. 3A-3C. Storage of records in the staging layer is also described in greater detail below in connection with FIGS. 6 and 7 below. It will be appreciated that it may not be known what each data field in each of the one or more stage tables actually represents at the time of data ingestion. However, it may be necessary to interpret and utilize the data in each of the one or more stage tables to thereafter utilize the content represented by each record in each stage table within the staging layer.

Accordingly, in some example embodiments contemplated herein, the apparatus 400 may include means, such as data modeling circuitry 412, or the like, for retrieving a definition set defining the type of information stored in each data field of a particular stage table. The definition set may be retrieved from the data source via communications circuitry 408 or it may be retrieved from manual user entry via input/output circuitry 406. In any event, this definition set can then be used by the apparatus 400 to interpret the data in each record of the particular stage table (e.g., for subsequently hydrating a data integration layer based on the records stored in stage tables in the staging layer). Each definition set may be manually created by a person who has a preexisting understanding of the data source corresponding to the particular stage table. Alternatively, in some embodiments a known definition set used for a different stage table may also be used for the particular stage table, if it can be determined that the data source corresponding to that different stage table is associated with the data source corresponding to the particular stage table.

In operation 506 the apparatus 400 includes means, such as data modeling circuitry 412 or the like, for generating, using the one or more stage tables in the staging layer, a data integration layer for modeling data represented by the data ingested into the one or more stage tables in the staging layer. Generating this data integration layer may include generation of one or more data alignment tables and one or more corresponding key mapping tables, as described in connection with FIG. 5 of U.S. patent application Ser. No. 15/086,266, filed Mar. 31, 2016. Accordingly, it will be understood that the use of standardized plumbing fields as described herein may be implemented in the context of the data modeling platform described in connection with U.S. patent application Ser. No. 15/086,266. From operation 506, the procedure may advance to operation 512 below, wherein the data modeling platform can respond to user queries. Additionally or alternatively, the procedure may advance to optional operations 508 and 510 below if additional records are to be ingested from one or more of the data sources.

As noted previously, receipt of records from the plurality of data sources may occur periodically or, in any event, may occur more than a single time. Accordingly, in optional operation 508, the apparatus 400 may include means, such as data ingestion circuitry 410 or the like, for ingesting one or more additional records from the plurality of data sources into the one or more stage tables in the staging layer.

From operation 508, the procedure may advance to optional operation 510, in which the apparatus 400 may include means, such as data modeling circuitry 412, or the like, for updating the data integration layer based on the ingested one or more additional records. Subsequently, the procedure may advance to optional operation 512 in an instance in which a user query is received.

In optional operation 512, the apparatus 400 may include means, such as processor 402, input/output circuitry 406, communications circuitry 408, or the like, for responding to user queries. In some embodiments, operation 512 may include processing a query requesting information for retrieval, identifying, using the data integration layer and a subset of the one or more stage tables, data corresponding to the information for retrieval, and outputting the identified data. More specifically, the apparatus 400 may identify the information for retrieval using the data integration layer of the data modeling platform, and the apparatus 400 can then retrieve identifying data from within the data integration layer or from one or more of the stage tables, and then output the collected information.

Turning next to FIG. 6, example operations are described for analyzing inbound records and determining whether to store them in the staging layer, in accordance with example embodiments described herein. As such, the operations described in connection with FIG. 6 illustrate example refinements of operations 504 and 510 of FIG. 5. In this regard, the operations described in connection with FIG. 6 may follow from operations 502 or 508, described above, and may in turn be followed by operations 506 or 512. In this regard, FIG. 6 illustrates a scenario in which a set of records are received from a plurality of data sources. For each particular record received, the following procedure may be implemented in some embodiments.

In operation 602 the apparatus 400 includes means such as data ingestion circuitry 410 or the like, for determining whether the particular record corresponds to a preexisting record in one of the stage tables in the staging layer. In some embodiments, the apparatus 400 may perform this determination by hydrating one or more standardized plumbing fields for the particular record, and then comparing the hydrated standardized plumbing fields to standardized plumbing fields of the set of records stored in the stage table in the staging layer that corresponds to the data source from which the particular record is received. Specifically, this correspondence may be determined based on a comparison of a source primary key (e.g., the CDC_KEY) or its hash of the particular record with source primary keys or their hashes for the set of records in the stage table. When the source primary key of the particular record is identical to the source primary key of a preexisting record in the stage table, then the apparatus 400 may determine that the particular record corresponds to a preexisting record in the stage table. That is, if a record existing in the stage table shares the same unique source primary key for that source as the inbound record, the inbound record already exists in the stage table. Additionally or alternatively, the fields that are compared may comprise the data source name (e.g., REC_SRC) field and the data source data set name (REC_SRC_TBL) fields, which in conjunction can uniquely identify the originating system of the particular record and any preexisting record in the stage table. Origination comparison can provide a useful clue regarding whether two records may correspond to each other. In an instance in which the particular record does correspond to a preexisting record, then the procedure advances to operation 604. If the particular record does not correspond to a preexisting record, however, the particular record is new, and the procedure advances to operation 608 to store the record.

In operation 604 the apparatus 400 includes means such as processor 402, memory 404, data ingestion circuitry 410 or the like, for determining whether the record has a SRC_DEL_FLG field equal to 'N'. If so, then the record corresponds to an existing record and the source table has not deleted the record. In this circumstance, the procedure advances to operation 606. If, however, SRC_DEL_FLG is equal to 'Y', then that indicates that the record corresponds to an existing record, but the source table has deleted the record. In that case, the procedure advances to operation 610, as the record will not be stored.

In operation 606, the apparatus 400 includes means such as data ingestion circuitry 410, or the like, for determining whether the particular record is different than the preexisting record that matched it in operation 602. In some embodiments, this may include a character comparison or a hash comparison between the standardized plumbing fields contained in the particular record to the standardized plumbing fields contained in the preexisting record in the stage table. In some embodiments, this may include hydrating one or more additional standardized plumbing fields for the particular record (e.g., the stage table primary key field (e.g., PRIM_KEY), and/or the source attribute data field (e.g., CDC_ATTR) to facilitate the determination of whether the particular record is different than the preexisting record). The source attribute data field or its hash of the inbound record and the source attribute data field of the preexisting record may be compared to determine if the non-primary data fields of the inbound record has changed since the preexisting record was stored in the staging table. If it is determined that there is not a match, the record has been modified since the preexisting record was ingested, and the procedure advances to operation 608 so that the changed version can be stored in the stage table. If it is determined that there is a match of the source attribute data fields, the stage table primary key fields of the inbound and preexisting records may be compared. If it is determined that there is not a match of the stage table primary key fields, this is an indication that the record has been modified back to a previous version of the record. That is, the data in the record has been modified since the preexisting record was ingested, and then modified again to revert back to a version of the record that matches the data in the preexisting record.

For example, as discussed previously in connection with FIG. 3D, an example is shown in which a source table 304 provides a first record identifying of an individual John Q Public who has a weight of 180 pounds, a second record identifying the same individual having a weight of 175 pounds, and then identifies a third record 340 of the same individual again having a weight of 180 pounds. Without use of a stage table primary key field comparison, the apparatus 400 would determine that the third record 340 is the same record as the first record, when in fact the third record 340 illustrates a reversion to the same collection of data, but at a different point in time. Instead, performance of the stage table primary key comparison indicates a change in data even though the data matches an earlier version of the record, and the procedure would advance to operation 608 so that the changed version can be stored in the stage table. If it is determined that there is a match of the stage table primary key, then there is no need to store the record, and the procedure advances to operation 610.

In operation 608 the apparatus 400 includes means such as data ingestion circuitry 410 or the like, for storing the record in a stage table corresponding to the data source from which the particular record is received. Storage of records is described in greater detail below in connection with FIG. 7. Following storage of the record, the procedure returns to operation 506 or 512, described previously, in which the data ingestion layer can be updated to account for the new records in the staging layer.

Finally, in operation 610, it is determined that the record is either a duplicate (if the procedure advances to operation 610 from operation 606) or has been deleted from the source table (if the procedure advanced to operation 610 from operation 604). In either case, the particular record is not stored, and the procedure returns to operation 506 or 512, described previously.

Turning next to FIG. 7, example operations are disclosed for ingesting a target record that is received from a particular data source, in accordance with some example embodiments described herein.

In operation 702, the apparatus 400 includes means such as data ingestion circuitry 410 or the like, for storing a copy of the target record in a particular stage table in the staging layer that corresponds to the particular data source.

In operation 704, the apparatus 400 includes means such as data ingestion circuitry 410 or the like, for inserting the set of standardized plumbing fields into the copy of the target record in the stage table. As noted previously, these standardized plumbing fields comprise a set of descriptive fields that in some embodiments includes a stage table primary key field, a source primary key field, a source attribute field, a data source name field, a data source data set name field, and a source delete flag, as described previously in connection with FIGS. 3A-3C. The standardized plumbing fields further include a timestamp field. In some embodiments, the descriptive fields further include at least one of an expiry timestamp field and a natural key field. As discussed previously, the expiry timestamp field illustrates a date and time at which a record was overwritten (if it was). Moreover, through the use of tuning templates, embodiments contemplated herein provide the ability to manipulate the particular data elements used for population of any of the standardized plumbing fields, thus providing a powerful tool by which a data integration layer—which is built from the set of standardized plumbing fields used in the staging layer—can be revised for performance optimization in an automatic way that is consistent, universal, and accurate. Through the use of these standardized plumbing fields, the descriptive fields, when populated, facilitate the determination, by the data modeling platform 200, of changes in the record over time, even without understanding the underlying meaning of many attributes represented by fields in the record.

In operation 706, the apparatus 400 includes means such as data ingestion circuitry 410 or the like, for populating the standardized plumbing fields. In some embodiments, the apparatus 400 may populate the descriptive fields of the set of standardized plumbing fields based on the content of the target record and a tuning template, as described herein. For instance, the apparatus 400 may populate the timestamp field with a current date and time representing the time of ingestion. Finally, the apparatus 400 may optionally update an expiry timestamp field (e.g., EXPR_DTS) for all records stored in a stage table. In this regard, as noted previously in conjunction with a description of FIG. 3B, use of an expiry timestamp field can reduce the processing time needed for certain queries significantly despite the ability to derive the value of the expiry timestamp field from other fields included in the standardized plumbing fields, thus rendering this optional field.

Figure 8:
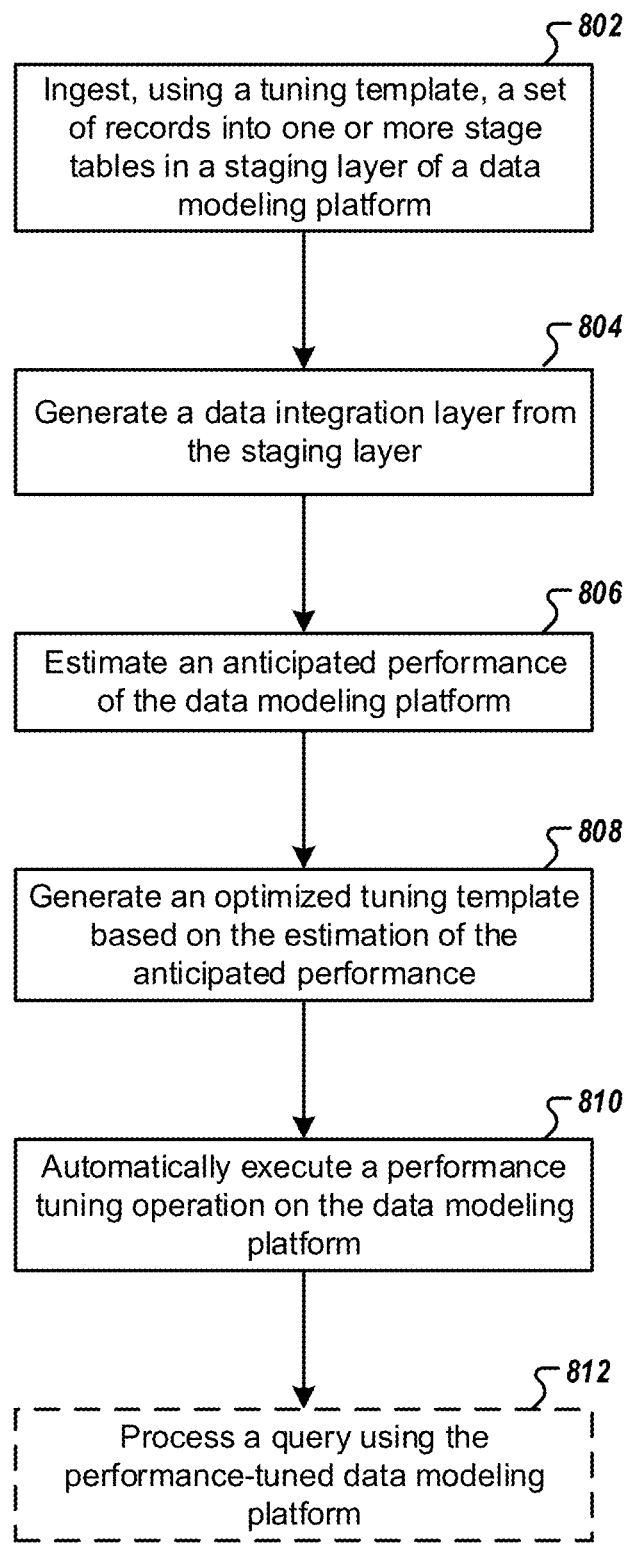
FIG. 8 illustrates a flowchart describing example operations for automated performance tuning of a data modeling platform, in accordance with some example embodiments described herein.

Turning finally to FIG. 8, example operations are disclosed for automated performance tuning of a data modeling platform such as may be developed using the techniques described above in connection with FIGS. 5-7.

As shown at 802, the apparatus 400 includes means such as data ingestion circuitry 410, or the like, for ingesting, using a tuning template, a set of records from one or more data sources into one or more stage tables in a staging layer of the data modeling platform. In some embodiments, ingesting a target record from a particular data source includes storing a copy of the target record as a record in a particular stage table in the staging layer that corresponds to the particular data source, adding a set of standardized plumbing fields into the record, and applying a default tuning template to the record to populate the set of standardized plumbing fields.

As shown at 804, the apparatus 400 includes means such as data modeling circuitry 412 or the like, for generating, using the one or more stage tables, a data integration layer of the data modeling platform for modeling data represented by the set of records ingested into the one or more stage tables. In this regard, generating the data integration layer using the one or more stage tables may comprise generating, by the data modeling circuitry, a data alignment table defining a desired set of data fields, and generating, by the data modeling circuitry and using the one or more stage tables and the data alignment table, a key mapping table identifying correspondences between data fields in the one or more stage tables and data fields in the data alignment table. Moreover, generating the data alignment table may comprise identifying, by the data modeling circuitry and from within one of the one or more stage tables, a record having a unique combination of values for the desired set of data fields defined by the data alignment table, generating, by the data modeling circuitry, a new record in the data alignment table corresponding to the identified record, and populating fields in the data alignment table for the generated new record based on the unique combination of values. Because uniqueness of a combination of values for the desired set of data fields may depend in many cases upon uniqueness of certain standardized plumbing fields for a record in a stage table (e.g., the CDC_KEY or the NAT_KEY), designing the manner by which standardized plumbing fields are populated in a way that restricts (or expands) the number of records that have the requisite unique combination of values for a given data alignment table can adjust the number of records that will be added to a given data alignment table. This functionality offers many tools for implementing performance tuning based on the estimated anticipated performance of a data modeling platform.

As shown at 806, the apparatus 400 includes means such as tuning circuitry 414 or the like, for estimating an anticipated performance of the data modeling platform. To this end, the data integration layer comprises a plurality of partitions, and estimating the anticipated performance of the data integration layer includes determining a degree of skew between the various partitions in the plurality, and estimating, by the tuning circuitry, the anticipated performance of the data integration layer based on the determined degree of skew. And in turn, determining the degree of skew may, in turn, comprise calculating, by the tuning circuitry, a number of records in each partition in the data integration layer, and determining, by the tuning circuitry and based on the number of records in each partition in the data integration layer, the degree of skew between partitions in the data integration layer. It will be understood, however, that in some embodiments, other techniques may additionally or alternatively be used for estimating an anticipated performance of the data modeling platform. As one example, anticipated performance can be estimated by data set size more generally (e.g., a size of partitions). As another example, anticipated performance can be estimated by the amount of duplication of data within a data set (which may, for instance, indicate that partition size can be reduced without data loss to improve performance).

As shown at 808, the apparatus 400 includes means such as tuning circuitry 414 or the like, for generating, by the tuning circuitry, an optimized tuning template based on the estimated anticipated performance. In this regard, an optimized tuning template comprises a tuning template that, when applied to all records in all stage tables in the staging layer, modifies all corresponding sets of standardized plumbing fields such that generating a data integration layer using the modified data in the stage tables will automatically produce an optimized data integration layer, and thus provide a performance-tuned the data modeling platform. Put another way, an optimized tuning template is a tuning template that facilitates generation of a set of data structures in the data integration layer (e.g., the data alignment tables and key mapping tables) to meet the goals identified in the estimated anticipated performance of the data modeling platform. For instance, if utilization of a default tuning template generates a set of data alignment tables having wildly divergent numbers of records, then there is a high likelihood of this significant skew creating processing bottlenecks that ultimately degrade performance. In a big data environment, processing of data records requires the use of parallel processing, and while parallel processing is generally faster than serial processing, even one node in a parallel processing architecture running slower than others can cause significant performance degradation if all nodes must complete their tasks before any nodes can proceed to a next stage of operation. It will be understood that the optimal tuning template may be received by communications circuitry of the data modeling platform from a user who has specifically tailored a single instance of the data transformations to be used to populate standardized plumbing fields.

As shown at 810, the apparatus 400 includes means for automatically executing a performance tuning operation on the data modeling platform. In this regard, to automatically execute the performance tuning operation on the data modeling platform, the apparatus 400 may include means, such as tuning circuitry 414, or the like, for applying the optimized tuning template to all records in all stage tables in the staging layer to update all corresponding sets of standardized plumbing fields. Moreover, the apparatus may further include means, such as data modeling circuitry 412 or the like, for, in response to applying the optimized tuning template, generating the data integration layer by the data modeling circuitry using the one or more stage tables. The design of the optimized tuning template ensures that the standardized plumbing fields are populated such that, when used for generation of a data integration layer, the resulting data integration layer is performance-tuned.

One example of a tuning operation that may be performed utilizing the modification of standardized plumbing fields include the completion of a skewed join operation to mitigate data skew. In a Hadoop environment, using standard joins in transformation logic with Pig or Hive tools can at times result in weird performance of MapReduce jobs, as the data being processed might have some skewness (e.g., it may be that 80% of the data is going to a single reducer). If there is a huge amount of data for a single key, then one reducer can be held up processing a majority of the data. Skewed join compute a histogram to find out which key is dominant and then data is split based on its various reducers to achieve optimal performance. However, it should be understood that other methods for estimating an anticipated performance of the data modeling platform may exist as well.

As another example, whenever there is excess swap memory utilization, memory usage can be optimized by configuring the mapred.child.java.opts property by reducing the amount of RAM that is allotted to each task in mapred.child.java.opts.

In yet another example, better 10 performance can be achieved by disabling a checkpoint in Apache Hadoop Data File System (HDFS), as HDFS supports a write-once-read-many times' model. To achieve this result, the mount points for DataNode or data directories should be configured with the noatime option to ensure that the metadata is not updated by the NameNode every time the data is accessed. The mounts for MapReduce storage and DFS, when mounted with noatime option, deactivates access time tracking, and thus rendering enhanced IO performance.

As yet another example of a performance tuning optimization, disk spill can be minimized by compressing a given Map output. In this regard, disk IO is a major performance bottlenecks and two ways that help minimize disk spilling are the following: (1) ensuring that the mapper for a given MapReduce job uses 70% of heap memory for spill buffer, or (2) compress the Mapper output.

As yet another example of possible performance tuning, if a huge amount of data is being written to the disk during execution of Map tasks, then increasing the memory size of the buffer can help. Generally, when the map task is not able to holding the data into the memory, it spills it to local disk which is a time-consuming process because of the number of IO operations involved. To avoid this situation, configure the parameters io.sort.mb and io.sort.factor to increase the size of buffer memory and attain optimal performance.

One other example of a performance tuning operation is to tune the number of Mapper or Reducer tasks. Every Map or Reduce task usually takes 40 seconds to complete execution. Also, when there is a large job to be executed, these tasks do not make the best use of all the slots in a given cluster. Thus, it is extremely important to tune the number of Map or Reduce tasks using the following techniques. First, if the MapReduce job has more than 1 terabyte of input, then, to ensure that the number of tasks are smaller, the block size of the input dataset should be increased to 512M or 256M. If the MapReduce job on the Hadoop cluster launches several map tasks wherein each task completes in just few seconds, however, then reducing the number of maps being launched for that application without impacting the configuration of the Hadoop cluster will help optimize performance. Moreover, setting up and scheduling tasks requires time overhead, so if a task takes less than 30 seconds to execute, then it is better to reduce the number of tasks.

Returning to FIG. 8, operation 812 illustrates that the apparatus 400 may also include means such as processor 402 or the like, for processing a query using the performance-tuned data modeling platform. In some embodiments, operation 812 may include processing a query requesting information for retrieval, followed by identifying, using the data integration layer and a subset of the one or more stage tables, data corresponding to the information for retrieval, and finally outputting of the identified data. More specifically, the apparatus 400 may identify the information for retrieval using the data integration layer of the data modeling platform, and the apparatus 400 can then retrieve identifying data from within the data integration layer or from one or more of the stage tables, and output the collected information. Once the data modeling platform has been performance-tuned in the manner described above, this query should also be optimized in the manner that mitigates one or more performance issues that may have been identified in operation 806.

As described above, example embodiments of the present invention provide methods and apparatuses that enable an entity to more quickly and efficiently performance tune the data sets hosted by an enterprise data modeling platforms en masse, and can thereby provide more agile maintenance during acquisitions, platform changes, and the like. As such, example embodiments facilitate automated, consistent, fast, and cheap performance tuning of a data modeling platform. By increasing system performance on a number of different technical metrics, example embodiments thus provide improvements to the functionality of the computing platform itself.

FIGS. 5-8 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 employing an embodiment of the present invention and executed by a processor of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automated performance tuning of a data modeling platform, the method comprising:
   ingesting, by data ingestion circuitry of the data modeling platform and using a tuning template, a set of records from one or more data sources into one or more stage tables in a staging layer of the data modeling platform, wherein the one or more stage tables comprise a set of standardized plumbing fields, wherein at least one of the standardized plumbing fields comprises a source primary key having a value that is a hash of an arrangement of related source data fields, the arrangement of the related source data fields identified according to instructions of the tuning template, for identifying the arrangement of the related source data fields;
   generating, by data modeling circuitry of the data modeling platform and using the one or more stage tables, a data integration layer of the data modeling platform for modeling data represented by the set of records ingested into the one or more stage tables;
   estimating, by tuning circuitry of the data modeling platform, an anticipated performance of the data modeling platform;
   generating, by the tuning circuitry, a modified tuning template based on the estimated anticipated performance, the modified tuning template reflecting a change to the instructions for identifying the arrangement of the related source data fields included in the source primary key; and
   automatically executing a performance tuning operation on the data modeling platform according to the modified tuning template, wherein the execution results in a change in the arrangement of the related source data fields included in the hash, and results in a change of the value of the source primary key.

2. The method of claim 1, further comprising:
   after automatically executing the performance tuning operation on the data modeling platform, processing a query using the data modeling platform.

3. The method of claim 1, further comprising: ingesting a subsequent target record from a particular data source by:
 storing a copy of the subsequent target record as a subsequent record in a particular stage table in the staging layer that corresponds to the particular data source;
 adding the set of standardized plumbing fields into the subsequent record; and
 applying the tuning template to the subsequent record to populate the set of standardized plumbing fields.

4. The method of claim 3, wherein the tuning template comprises a set of instructions for populating each of the set of standardized plumbing fields using values from one or more other fields in the copy of the target record.

5. The method of claim 1, wherein generating the data integration layer using the one or more stage tables comprises:
 generating, by the data modeling circuitry, a data alignment table defining a desired set of data fields; and
 generating, by the data modeling circuitry and using the one or more stage tables and the data alignment table, a key mapping table identifying correspondences between data fields in the one or more stage tables and data fields in the data alignment table.

6. The method of claim 5, wherein generating the data alignment table includes:
 identifying, by the data modeling circuitry and from within one of the one or more stage tables, a record having a unique combination of values for the desired set of data fields defined by the data alignment table;
 generating, by the data modeling circuitry, a new record in the data alignment table corresponding to the identified record; and
 populating fields in the data alignment table for the generated new record based on the unique combination of values.

7. The method of claim 1, wherein the data integration layer comprises a plurality of partitions, and wherein estimating the anticipated performance of the data integration layer includes:
 calculating, by the tuning circuitry, a number of records in each partition in the data integration layer;
 determining, by the tuning circuitry and based on the number of records in each partition in the data integration layer, a degree of skew between partitions in the data integration layer; and
 estimating, by the tuning circuitry, the anticipated performance of the data integration layer based on the determined degree of skew.

8. The method of claim 1, wherein the modified tuning template comprises a tuning template that, when applied to all records in all stage tables in the staging layer, modifies all corresponding sets of standardized plumbing fields such that generating a data integration layer using the one or more stage tables will automatically performance-tune the data modeling platform.

9. The method of claim 1, wherein the modified tuning template is received by communications circuitry of the data modeling platform.

10. The method of claim 1, wherein automatically executing the performance tuning operation on the data modeling platform comprises:
 applying the modified tuning template to all records in all stage tables in the staging layer to update all corresponding sets of standardized plumbing fields; and
 in response to applying the modified tuning template, generating the data integration layer by the data modeling circuitry and using the one or more stage tables.

11. An apparatus for automated performance tuning of a data modeling platform, the apparatus comprising:
 data ingestion circuitry configured to ingest, using a tuning template, a set of records from one or more data sources into one or more stage tables in a staging layer of the data modeling platform, wherein the one or more stage tables comprise a set of standardized plumbing fields, wherein at least one of the standardized plumbing fields comprises a source primary key having a value that is a hash of an arrangement of related source data fields, the arrangement of the related source data fields identified according to instructions of the tuning template, for identifying the arrangement of the related source data fields;
 data modeling circuitry configured to generate, using the one or more stage tables, a data integration layer of the data modeling platform for modeling data represented by the set of records ingested into the one or more stage tables; and
 tuning circuitry configured to
  estimate an anticipated performance of the data modeling platform, and
  generate a modified tuning template based on the estimated anticipated performance, the modified tuning template reflecting a change to the instructions for identifying the arrangement of the related source data fields included in the source primary key;
 wherein the apparatus is further configured to automatically execute a performance tuning operation on the data modeling platform according to the modified tuning template, wherein the execution results in a change in the arrangement of the related source data fields included in the hash according to the change in the instructions, and results in a change of the value of the source primary key.

12. The apparatus of claim 11, wherein the apparatus is further configured to:
 after automatically executing the performance tuning operation on the data modeling platform, process a query using the data modeling platform.

13. The apparatus of claim 11, wherein the data ingestion circuitry is further configured to ingest a subsequent target record from a particular data source by:
 storing a copy of the subsequent target record as a subsequent record in a particular stage table in the staging layer that corresponds to the particular data source;
 adding the set of standardized plumbing fields into the subsequent record; and
 applying the tuning template to the record to populate the set of standardized plumbing fields.

14. The apparatus of claim 13, wherein the tuning template comprises a set of instructions for populating each of the set of standardized plumbing fields using values from one or more other fields in the copy of the target record.

15. The apparatus of claim 11, wherein the data modeling circuitry is configured to generate the data integration layer using the one or more stage tables by:
 generating a data alignment table defining a desired set of data fields; and
 generating, using the one or more stage tables and the data alignment table, a key mapping table identifying correspondences between data fields in the one or more stage tables and data fields in the data alignment table.

16. The apparatus of claim 15, wherein the data modeling circuitry is configured to generate the data alignment table by:
- identifying, from within one of the one or more stage tables, a record having a unique combination of values for the desired set of data fields defined by the data alignment table;
- generating a new record in the data alignment table corresponding to the identified record; and
- populating fields in the data alignment table for the generated new record based on the unique combination of values.

17. The apparatus of claim 11, wherein the data integration layer comprises a plurality of partitions, and wherein the tuning circuitry is configured to estimate the anticipated performance of the data integration layer by:
- calculating a number of records in each partition in the data integration layer;
- determining, based on the number of records in each partition in the data integration layer, a degree of skew between partitions in the data integration layer; and
- estimating the anticipated performance of the data integration layer based on the determined degree of skew.

18. The apparatus of claim 11, wherein the modified tuning template comprises a tuning template that, when applied to all records in all stage tables in the staging layer, modifies all corresponding sets of standardized plumbing fields such that generating a data integration layer using the one or more stage tables will automatically performance-tune the data modeling platform.

19. The apparatus of claim 11, wherein the apparatus is configured to automatically executing the performance tuning operation on the data modeling platform by:
- applying the modified tuning template to all records in all stage tables in the staging layer to update all corresponding sets of standardized plumbing fields; and
- in response to applying the modified tuning template, generate the data integration layer by the data modeling circuitry and using the one or more stage tables.

20. A computer program product comprising at least one non-transitory computer-readable storage medium for automated performance tuning of a data modeling platform, the at least one non-transitory computer-readable storage medium storing computer-executable instructions that, when executed, cause an apparatus to:
- ingest, using a tuning template, a set of records from one or more data sources into one or more stage tables in a staging layer of the data modeling platform, wherein the one or more stage tables comprise a set of standardized plumbing fields, wherein at least one of the standardized plumbing fields comprises a source primary key having a value that is a hash of an arrangement of related source data fields, the arrangement of the related source data fields identified according to instructions of the tuning template, for identifying the arrangement of the related source data fields;
- generate, using the one or more stage tables, a data integration layer of the data modeling platform for modeling data represented by the set of records ingested into the one or more stage tables;
- estimate an anticipated performance of the data modeling platform;
- generate a modified tuning template based on the estimated anticipated performance, the modified tuning template reflecting a change to the instructions for identifying the arrangement of the related source data fields included in the source primary key; and
- automatically execute a performance tuning operation on the data modeling platform according to the modified tuning template, wherein the execution results in a change in the arrangement of the related source data fields included in the hash according to the change in the instructions, and results in a change of the value of the source primary key.

* * * * *